US012730986B2

(12) United States Patent
Butler et al.

(10) Patent No.: US 12,730,986 B2
(45) Date of Patent: Sep. 8, 2026

(54) COUNTERFEIT DETECTION AND PROVENANCE WITH GRATING INTERFEROMETRY, BLOCKCHAIN, AND SMART CONTRACTS

(71) Applicants: Board of Supervisors of Louisiana State University and Agricultural and Mechanical College, Baton Rouge, LA (US); Louisiana Tech Research Corporation, Ruston, LA (US)

(72) Inventors: Leslie G. Butler, Baton Rouge, LA (US); Michele L. Maasberg, Baton Rouge, LA (US); Charles Hartman, Baton Rouge, LA (US); Ian Taylor, Baton Rouge, LA (US)

(73) Assignees: Board of Supervisors of Lousiana of Lousiana State University and Agricultural and Mechanical College, Baton Rouge, LA (US); Louisiana Tech Research Corporation, Ruston, LA (US); Refined Imaging LLC, Baton Rouge, LA (US)

( * ) Notice: Subject to any disclaimer, the term of this patent is extended or adjusted under 35 U.S.C. 154(b) by 0 days.

(21) Appl. No.: 18/706,478

(22) PCT Filed: Nov. 10, 2022

(86) PCT No.: PCT/US2022/049597
§ 371 (c)(1),
(2) Date: May 1, 2024

(87) PCT Pub. No.: WO2023/086506
PCT Pub. Date: May 19, 2023

(65) Prior Publication Data
US 2025/0045538 A1 Feb. 6, 2025

Related U.S. Application Data

(60) Provisional application No. 63/277,850, filed on Nov. 10, 2021.

(51) Int. Cl.
*G06K 1/12* (2006.01)
*G01N 23/20* (2018.01)

(52) U.S. Cl.
CPC ....... *G06K 1/121* (2013.01); *G01N 23/20075* (2013.01)

(58) Field of Classification Search
CPC ... G06K 1/121; G01N 23/20075; G03B 27/52
(Continued)

(56) References Cited

U.S. PATENT DOCUMENTS

| | | | | |
|---|---|---|---|---|
| 6,936,334 | B2 * | 8/2005 | Blazey | G03G 21/04 283/902 |
| 9,626,608 | B2 | 4/2017 | Bobbitt, III | |

(Continued)

FOREIGN PATENT DOCUMENTS

| | | | | |
|---|---|---|---|---|
| JP | 4100651 | B2 * | 6/2008 | |
| WO | 2019/045738 | A1 | 3/2019 | |

OTHER PUBLICATIONS

International Search Report issued in PCT/US2022/049597 on Apr. 27, 2023.

(Continued)

*Primary Examiner* — Edwyn Labaze
(74) *Attorney, Agent, or Firm* — Venable LLP; Keith G. Haddaway; Ryan T. Ward

(57) ABSTRACT

A method and apparatus for differentiating between authentic and counterfeit item, and legacy additive manufactured (AM) components securely throughout the lifecycle using grating interferometry, blockchain, and smart contracts. The method includes fabrication of a trust anchor by laser power
(Continued)

modulation to selectively create porosity which can encode digital information within the component using programmable invisible ink (PGII). X-ray interferometry reads out the digital information as well as texture unique to the component. A quick response (QR) code is implemented with other anti-counterfeiting features to increase efficiency. A smart contract between X-ray interferometry radiography instruments and a blockchain database establishes item provenance. The characteristics of PGII are compatible with additive manufacturing, as well as other manufacturing processes such as injection molding and casting. The method and apparatus have minimal impact on the component fabrication, detects counterfeiting and sabotage, and is conformal to existing item identification standards.

10 Claims, 12 Drawing Sheets

(58) Field of Classification Search
USPC ............................ 235/494, 487, 375; 705/50
See application file for complete search history.

(56) References Cited

U.S. PATENT DOCUMENTS

| | | | | |
|---|---|---|---|---|
| 10,065,264 | B2 | 9/2018 | Dietrich | |
| 10,432,409 | B2 | 10/2019 | Wallrabenstein | |
| 10,456,976 | B1 | 10/2019 | Boyle | |
| 2002/0089653 | A1* | 7/2002 | Iida | G03D 15/001 396/311 |
| 2005/0028411 | A1 | 2/2005 | Yu | |
| 2005/0258250 | A1 | 11/2005 | Melick | |
| 2006/0078673 | A1 | 4/2006 | Ripstein | |
| 2008/0274028 | A1 | 11/2008 | Lin et al. | |
| 2017/0316713 | A1 | 11/2017 | Hyman | |
| 2018/0012311 | A1 | 1/2018 | Small et al. | |
| 2019/0279204 | A1* | 9/2019 | Norton | G06Q 10/08 |
| 2019/0349426 | A1* | 11/2019 | Smith | H04L 63/123 |
| 2020/0059363 | A1 | 2/2020 | Lobo et al. | |
| 2020/0398549 | A1 | 12/2020 | Ritchie et al. | |
| 2021/0119771 | A1 | 4/2021 | Butters | |
| 2021/0138823 | A1 | 5/2021 | Demartin Maeder et al. | |
| 2021/0277268 | A1 | 9/2021 | Martin et al. | |

OTHER PUBLICATIONS

Written Opinion issued in PCT/US2022/049597 on Apr. 27, 2023.
Lehmhus et al., "State of the Art and Emerging Trends inAdditive Manufacturing: From Multi-Material processes to 3D printed Electronics", MATEC Web of Conferences,(2018), 188:03013, (10 pages).
Yampolskiy et al. "Security of Additive Manufacturing: Attack Taxonomy and Survey", Additive Manufacturing, (Jan. 20, 2018), 21, (73 pages).
Chang et al., "Advanced Material Strategies for Next-Generation Additive Manufacturing", Materials, (2018), 11(1): 166, (19 pages).
McGrath, "Cybersecurity for Advance Manufacturing—Protecting the Digital Thread", In Proceedings of the Cybersecurity for DDM Symposium, (Apr. 2015), 66-74. National Institute of Standards and Technology.
Chen et al., "Embedding Tracking Codes in Additive Manufactured Parts for Product Authentication", Advanced Engineering Materials, (2019), 21(4), (8 pages).
Wei et al., "Embedding Anti-counterfeiting Features in Metallic Components via Multiple Material Additive Manufacturing", Additive Manufacturing, (2018), 24:1-12, (34 pages).
Xie et al., "Pattern MemorySurface (PMS) with Dynamic Wrinkles for Unclonable Anticounterfeiting", ACS Materials Letters, (2019), 1, 77-82.
Li et al., "PrinTracker: Fingerprinting 3D Printers using Commodity Scanners", In Proceedings of the 2018 ACM SIGSAC Conference on Computer and Communications Security (CCS '18), (Oct. 15-19, 2018), 1306-1323, Toronto, Canada.
Kennedy et al., "Enhanced Anti-Counterfeiting Measures for Additive Manufacturing: Coupling Lanthanide Nanomaterial Chemical Signatures With Block chain Technology", Journal of Materials Chemistry C, (2017), 5 (37):9570-9578.
Billah et al., "Electrical and Thermal Characterization of 3D Printed Thermoplastic Parts with Embedded Wires for High Current- Carrying Applications", IEEE Access, (2019), 7, (24 pages).
Newman, "Franklin Making Money More Plentiful", Proceedings of the American Philosophical Society, (1971), 115(5):341-349.
Roberts, "The Veins of Pennsylvania: Benjamin Franklin's Nature-Print Currency", Grey Room 69, (2017), 50-79.
Brooks et al., "Neutron Interferometry Detection of Early Crack Formation Caused by Bending Fatigue in Additively Manufactured SS316 Dogbones", Materials & Design, (2018), 140:420-430, (22 pages).
Brooks et al., "Porosity detection in electron beam-melted Ti-6Al-4V using high-resolution neutron imaging and grating- based interferometry", Progress in Additive Manufacturing, (2017), 2, 125-132.
Kio et al., "Non- destructive evaluation of additively manufactured polymer objects using X-ray interferometry", Additive Manufacturing, (2018), 24, 364-372.
Wen et al., "Spatial Harmonic Imaging of X-ray Scattering - Initial Results", IEEE Transactions on Medical Imaging, (Aug. 2008), 27(8):997-1002, (14 pages).
Non-final Office Action issued in corresponding U.S. Appl. No. 19/418,486, on Jun. 25, 2026.

* cited by examiner

202 Provide a customized programmable invisible ink onto a selected area of the structure by using an inherent porosity or intentionally added porosity to the selected area of the structure, wherein the pores are smaller than can be imaged with X-ray radiography or CT 204 Convert the porosity of the customized programmable invisible ink to a digital data and storing the digital data in a data file 206 Read using X-ray interferometry said customized programmable invisible ink.

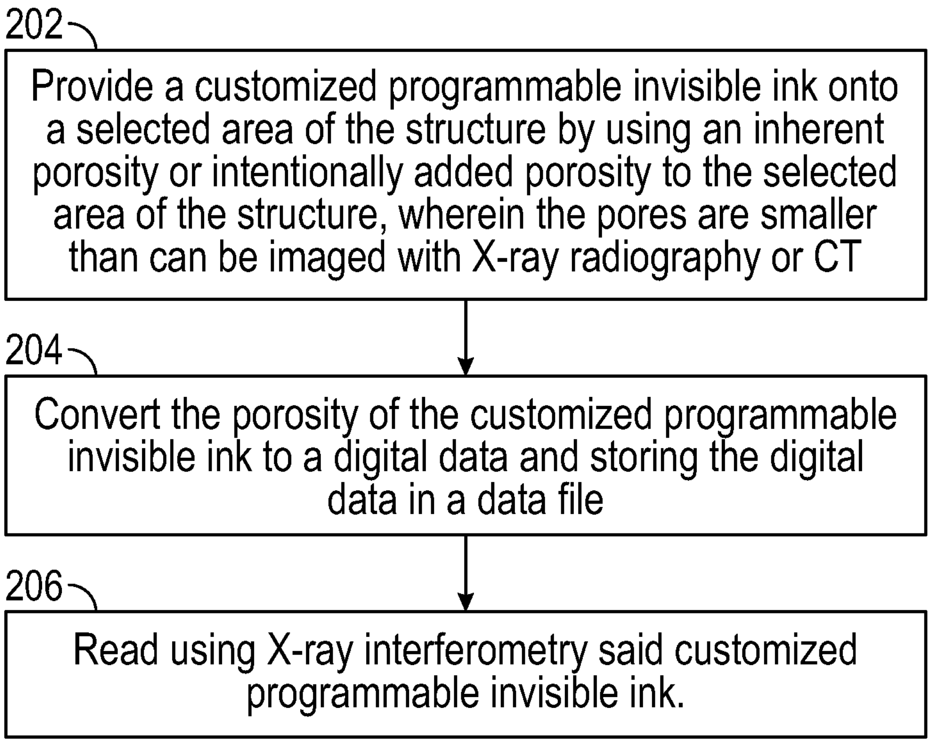

FIG. 10

COUNTERFEIT DETECTION AND PROVENANCE WITH GRATING INTERFEROMETRY, BLOCKCHAIN, AND SMART CONTRACTS

CROSS-REFERENCE TO RELATED APPLICATION

The present patent application is a U.S. National Stage of PCT/US2022/049597, filed Nov. 10, 2022, which claims priority benefit from U.S. Provisional Application No. 63/277,850, filed on Nov. 10, 2021, the entire content of which is incorporated herein by reference.

BACKGROUND OF THE INVENTION

1. Field of the Invention

The field of the currently claimed embodiments of this invention relates to detection of counterfeit manufactured components, and more particularly to a secure method for differentiating between authentic and counterfeit for high value, commodity, and legacy manufactured components throughout their lifecycle.

2. Discussion of Related Art

Additive manufacturing (AM) has developed from prototyping into well-established processes, spearheaded by 3D printing in the transport and medical sectors. With the rapid expansion of AM, the violation of intellectual property has been identified as a significant risk. The vulnerability to intellectual property infringers or counterfeiters is due to ease of compromise of product and process information. Counterfeiting is also widespread in components produced by other means such as injection molding and metal casting.

With respect to AM, counterfeiting refers to creating unauthorized copies or substitute products misrepresented as originating from an authorized source. It is the largest global criminal enterprise estimated at a cost of $1.7 trillion per year and millions of jobs, per a 2016 assessment jointly conducted by two European Agencies, the Organization for Economic Cooperation and Development (OECD) and the European Union Intellectual Property Office (EUIPO). In addition, counterfeit and pirated goods amounted to up to 5% of imports. The policy concerns shared by OECD and EUIPO are two-fold: "The first is the impact of crime and illicit trade activities on good governance, public safety and the rule of law. The second is the negative effect that counterfeit trade has on legitimate competitive advantage of rights holders, and consequently on innovation, employment and long-term economic growth." These examples underscore the need for disruptive technologies and processes to secure the global manufacturing supply chain from counterfeiting.

The decentralized and global nature of the supply chain for AM creates new attack vectors for counterfeiting due to ease of compromise of product and process information. For example, design files can be copied or stolen from collaborative platforms, which can be used to print with the same or lower quality parts. This activity can be difficult to identify even in the most secure supply chains. Industries encountering a large number of AM counterfeit products suffer potential financial loss and consequences related to endangering life. The development of scientifically reliable methods for protecting intellectual property in the AM supply chain is needed for improving the global competitiveness of US industry.

Traditional methods to address counterfeiting in other sectors are not suitable for AM. Current state of the art techniques for anti-counterfeiting and provenance in AM that address these shortcomings involve hardware fingerprint and watermarking approaches to identification, advanced capture and encoding processes, and blockchain implementations. For example, thermodynamic properties as well as surface wrinkles with wavy topography have been used in a manner analogous to biometric fingerprints. Past research also suggests that it is possible to identify the origin of unauthorized 3D printers based on unique fingerprints from hardware imperfections from the manufacturing process, as 3D printed objects from the same printer are assumed to have shared features. Advanced capture/encoding and processes to facilitate authentication include insertion of unclonable tags by advanced optics (watermarks, holograms), special chemicals where tags can be read by spectroscopic readers, distinctive material morphology, electromagnetic tags with unique signatures (e.g., Radio-Frequency Identification "RFID"), barcode, or quick-response (QR) passive authentication, nanomaterial barcodes, and gold nano-particle contrast agents. In addition, engineered nanomaterials have been embedded into a 3D part followed by an interrogation of the features to create a chemical signature profile (QR code written with fluorescence $Ln^{3+}$-doped filament), where the profile was then linked to a blockchain ledger.

Most of these techniques have not advanced past proof-of-concept as a single technology. Some other identification and authentication processes, such as embedding QR-codes with special inks, have not progressed past basic research and others suggest or demonstrate only a notional connection with a public blockchain and simple hash. None of extent techniques have been collectively advanced and demonstrated a successful, comprehensive end-to-end process for counterfeit detection and provenance for the additive manufacturing supply chain.

SUMMARY OF THE DISCLOSURE

An aspect of the present disclosure is to provide a method for providing an identification mark in a structure. The method includes providing a customized programmable invisible ink onto a selected area of the structure by using an inherent porosity or intentionally added porosity to the selected area of the structure. The pores are smaller than can be imaged with X-ray radiography or CT scanning. The method also includes converting the porosity of the customized programmable invisible ink to a digital data and storing the digital data in a data file; and reading using X-ray interferometry the customized programmable invisible ink.

A further aspect of the present invention is to provide a method for registering and authenticating an item on a blockchain platform. The method includes generating a serial number for an item: sending a request to a blockchain platform via a smart contract to initialize a blockchain based on the serial number: receiving a code via the smart contract, the code being generated by the blockchain platform, the code containing at least a serial number of a blockchain pointer: printing the item with the code to embed the code within the item: measuring a texture profile of the code embedded within the item using X-ray interferometry; and sending, via the smart contract to the blockchain platform, the code with the texture profile as a perceptual hash so that the blockchain platform completes initialization of the blockchain.

Another aspect of the present invention is to provide a method of authenticating an item. The method includes sending a request to a blockchain platform to initialize a blockchain via smart contract by providing a batch number and specifications for an embedded texture profile for using in printing on a package containing a plurality of items; and printing the batch number as an external batch number and internal texture profile on the package such that the batch number is visible on outside surface of the package. The method further includes receiving by a contracted nondestructive evaluation (NDE) company the package unopened and intact for two-dimensional X-ray interferometry; sending by the NDE company the batch number to the blockchain platform via smart contract and requesting by the NDE company a texture inspection profile: performing by the NDE company two-dimensional X-ray interferometry measurement on the package having the texture inspection profile; and sending by the NDE company the texture profile as a measured cryptographic hash to the blockchain platform.

Another aspect of the present invention is to provide a method for authenticating a legacy part using an inherent internal texture of the legacy part. The method includes creating a trust anchor for the part based on the inherent internal texture of the part, the part being known to be authentic: sending by an owner of the part a serial number of the part via smart contract to a blockchain platform certifying the authenticity of the part; generating by the blockchain platform a QR code containing at least the serial number and a blockchain pointer: returning the QR code, via smart contract, to the owner of the part; measuring the texture of the part with X-ray interferometry by a contracted NDE company: sending, via smart contract, the QR code and texture features as a perceptual hash back to the blockchain platform; and completing by the blockchain platform blockchain entry initialization.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

FIG. 10 is a flow diagram of a method for providing an identification mark in a structure, according to an embodiment of the present invention:

DETAILED DESCRIPTION

Figure 1A:
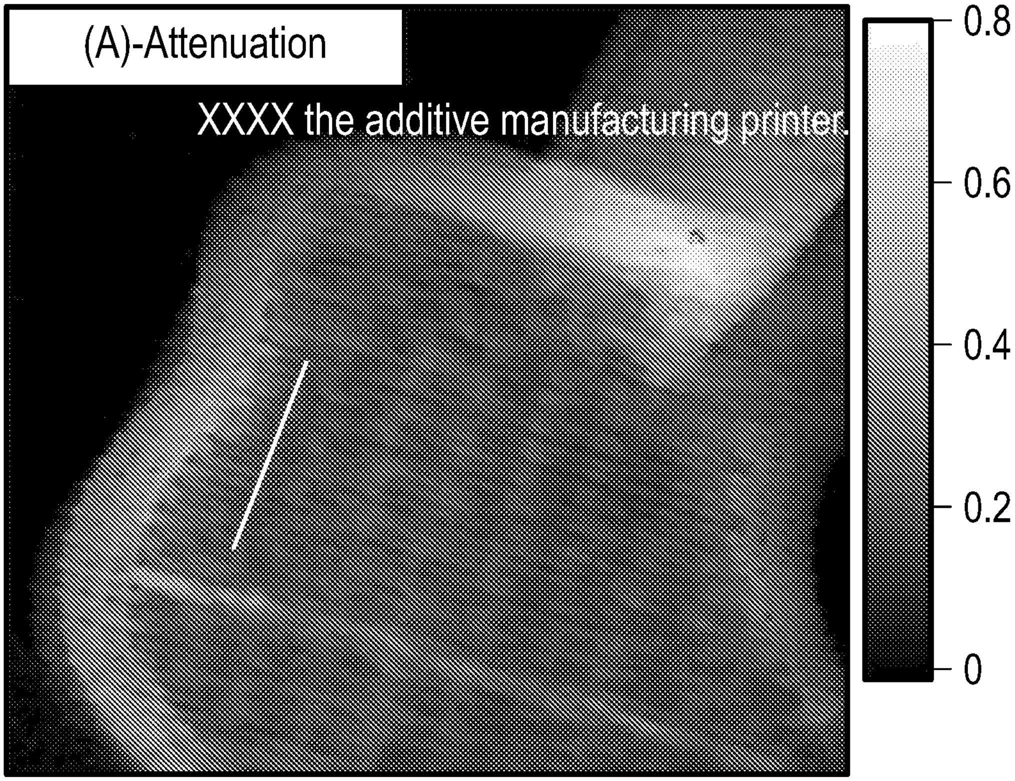
FIG. 1A shows an X-Ray attenuation of an example of texture embedded within an object in polymer additive, according to an embodiment of the present invention.

Present methods and apparatus build upon new methods in nondestructive evaluation of porosity in additive manufacturing, to turn porosity into a "programmable invisible ink" that can be read by fast X-ray interferometry imaging and incorporating security features such as challenge/response and a perceptual hash unique to each additive manufacturing printed part.

The methods and apparatus disclosed herein can solve at least two problems in the supply chain, specifically with regard to counterfeit detection and provenance. First, it can identify counterfeit items manufactured without proper authorization (i.e., items that are not authentic). Second, it can identify items that are authentic, branded products and either 1) at end-of-life that have been recovered from a disposal site and re-introduced into the supply chain without proper authorization: 2) sold through unauthorized distribution channels: or 3) overrun goods.

To illustrate both problems, consider the United States $100 currency note. Counterfeiting is possible at print sites outside the United States Federal Reserve. Counterfeiting may also be possible inside the United States Federal Reserve by employees printing extra currency, a counterfeiting process termed "production overrun." The second problem is illustrated by interception of currency destined for end-of-life destruction. The second problem is often labeled as "dumpster diving" or "blacktopping". The term blacktopping originated with the disposal of printed circuit boards (PCBs). Instead of reducing PCB components to recoverable metals, counterfeiters will extract electronic components, clean, apply fresh black paint to the integrated chips (hence, blacktopping), relabel, and sell the electronic components as new items.

To illustrate counterfeit detection and provenance, the $100 currency note is printed with a unique serial number and at least twelve unique features which are difficult to duplicate. The banking system logs serial numbers to detect production overrun and dumpster diving. The unique features, termed "texture," are used outside the banking system to detect currency printed by counterfeiters. The combination of serial number and texture in communication with a central, secure database is the essence of counterfeit detection and provenance for the $100 currency note. More broadly, the combination of serial number and texture is a major component of a "trust anchor."

The United States National Institute of Standards and Technology (NIST) has referred to methods for verifying identification and establishing authenticity of hardware and software for protected execution in digital environments as a "trust anchor" for protected execution in digital environments. The research and development of trust anchors is proceeding rapidly and is measured by the metrics of implementation, costs, and security.

A common implementation of a trust anchor into a manufactured item is an embossed serial number. A trust anchor can be incorporated in an item, part, etc. using laser power modulation, for example. Security can be enhanced by optical imaging of the surface texture. However, external trust anchors are susceptible to removal and transfer to a counterfeit item. Most sub-surface implementations are based on the addition of a foreign material to the manufactured object such as an X-ray absorbing material. The addition of a foreign material to the manufactured item generally leads to re-engineering and increased manufacturing costs. The implementation in this invention does not use foreign material.

The cost of inspection to prove or disprove part authenticity can be large. Currently, industrial X-ray tomography is used to generate detailed three-dimensional views of the interior of the suspect part: while often effective at detecting counterfeit parts, three-dimensional tomography is slow, on the order of 1 to 4 hours, and costly, more than $1000 per tomography dataset. A fast and less costly current option is two-dimensional X-ray radiography, on the order of 1 minute and $50. However, the two-dimensional (2D) images typically lack the image detail to prove or disprove part authenticity. The estimated cost of 2D X-ray interferometry is low, perhaps near the cost of 2D X-ray radiography and requiring only slightly longer imaging times.

Secure communication with a central database has been discussed in various patents. Secure communication is needed between the manufacturing site, the inspection sites, and the central database. Database security can be enhanced with blockchain tagged database records. To illustrate the importance of secure database and controlled access, consider the hypothetical case of a currency counterfeit. A combination of a printing, generation of unique serial numbers, and injection of those serial numbers into the Federal Reserve database is a counterfeiting activity that is difficult to detect.

Embodiments of the present invention consider additive manufacturing as a prime application. However, various aspects of the present invention are also applicable to casting, injection molding, and other manufacturing methods. Some embodiments of the present invention use advanced X-ray imaging based on grating interferometry, blockchain, and smart contracts. Some embodiments of the present invention may also use conventional X-ray imaging.

An embodiment of the present invention provides a secure method and apparatus for differentiating between authentic and counterfeit high-value and commodity additive manufactured components, and additionally includes the provenance of the high value part. A combination of advanced X-ray imaging, cryptographically signed aggregations of digital identifiers, and physical features and blockchain for securing information, is proposed as a process for providing a counterfeit and sabotage resistant manufacturing supply chain. The innovation is a standards-compatible procedure for encoding digital information inside an additive manufactured part at its manufacture, followed by secure readout and part validation through the part's usage and end-of-life. The technical details can be summarized as the following major components:

(1) Programmable invisible ink, a procedure for writing digital information into an AM component in a format not visible with conventional X-ray inspection. Programmable invisible ink enables a "trust anchor," uniquely identifying mark fabricated by laser power modulation or similar to selectively create porosity in the additive manufactured part which can encode digital information within, not on the surface, of the component.

(2) X-ray interferometry, a method for selectively reading digital information encoded in porosity from an additive manufactured component.

(3) Blockchain, smart contracts, and associated software applications, used for secure provenance from origin, including the CAD file, validation of the additive manufactured facility (e.g., printer, operator, location, job ID), through to usage and change of ownership to end-of-life declaration at aircraft graveyard, dumpster, or recycling.

(4) Provision is made for validated return-to-usage from disposal sites such as the aircraft graveyard as well as detection of dumpster diving followed by an illicit return-to-usage attempt.

(5) Multiple levels of part identification and validation include embedded serial number (validated, encrypted list), blockchain to OEM, blockchain to customer, and a physical implementation of three-way handshake at change of custody of the part. The digital encryption at all points of discussion is presumed to meet standards set forth by National Institute of Standards and Technology (NIST) Special Publication (SP) 800-57 Rev. 1 "Recommendation for Key Management: Part 1—General".

While additive manufacturing (AM) is the focus in the description of some embodiments of methods and apparatus, the process is also applicable to other methods of manufacturing. Injection molding, casting, and stamping manufacturing can also be used for commodity parts in the methods and apparatus of the present invention.

An aspect of the present invention accordingly includes several steps and the relation of one or more of such steps with respect to each of the others, and the apparatus embodying features of construction, combinations of elements and arrangement of parts that are adapted to affect such steps, all is exemplified in the following detailed disclosure, and the scope of the invention will be indicated in the claims. The following figures are used to illustrate the methods and apparatus.

Advanced X-ray imaging and blockchain secured databases can be proposed as a method for providing a counterfeit and sabotage resistant manufacturing supply chain. The methods and apparatus disclosed herein can include a trust anchor and a standards-compatible procedure for encoding digital information inside an additive manufacturing part at its manufacture, followed by secure readout and part validation through the part's usage and end-of-life.

As an unmodified 3D additive manufacturing printer fabricates a component, digital information can be embedded within multiple sites in the component. The digital information forms a deterministic identification for the component, which includes digitally signed physical and identification attributes, secured using blockchain. Authentic parts are labeled with this "trust anchor" and tracked using customized smart contracts that record the data using blockchain. In an embodiment, the trust anchor is a physical construct within the authentic component. In an embodiment, the physical portion of the trust anchor can be either the existing porosity or texture in the part (FIG. 3 before the Cantor dust), the features embedded into the part (FIG. 3C with the Cantor dust order 2 visible), or the porosity or texture written into the part (FIG. 3C with the Cantor dust order 3 invisible). From a technical standpoint, the identifier of the trust anchor can be generated using hashed digital origin information and combined using a Merkle tree, which uniquely links the information into an aggregate identifier that describes key aspects of the manufacturing process, i.e., the identifier is unique to how the component was made. Blockchain and associated smart contracts can convey the trust anchor to the supply chain database. Throughout the part lifetime, X-ray interferometry imaging uniquely reads out the component identification, the embedded digital information (FIG. 5, invisible ink) and texture (e.g., texture shown in FIG. 5), and updates the blockchain with component provenance. The method and apparatus have several novel features, described as follows.

Figure 1B:
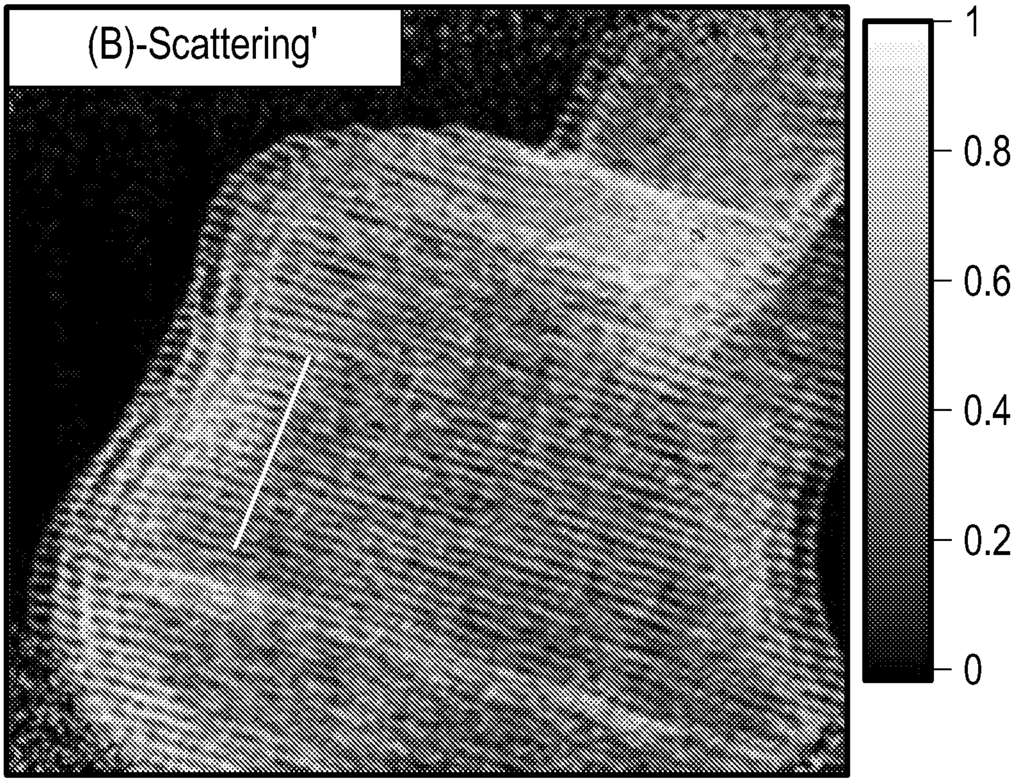
FIG. 1B shows an X-Ray interferometry of the example of texture embedded within the same object in polymer additive shown in FIG. 1A, according to an embodiment of the present invention.

FIG. 1A shows the X-Ray attenuation of an example of texture embedded within an object in polymer additive, according to an embodiment of the present invention. FIG. 1B shows the X-Ray interferometry of the example of texture embedded within the same object in polymer additive shown in FIG. 1A, according to an embodiment of the present invention. FIGS. 1A and 1B shows a Stanford Bunny graphics test object that is fabricated from ABS with fused deposition modeling polymer printing and imaged with a combination of (A) X-ray attenuation (FIG. 1A) and interferometry (FIG. 1B). The porosity between print filaments can be visible in the scattering image. This work shows fused deposition modeling yields parts with intrinsic porosity leading to a unique X-ray interferometry image.

Figure 2:
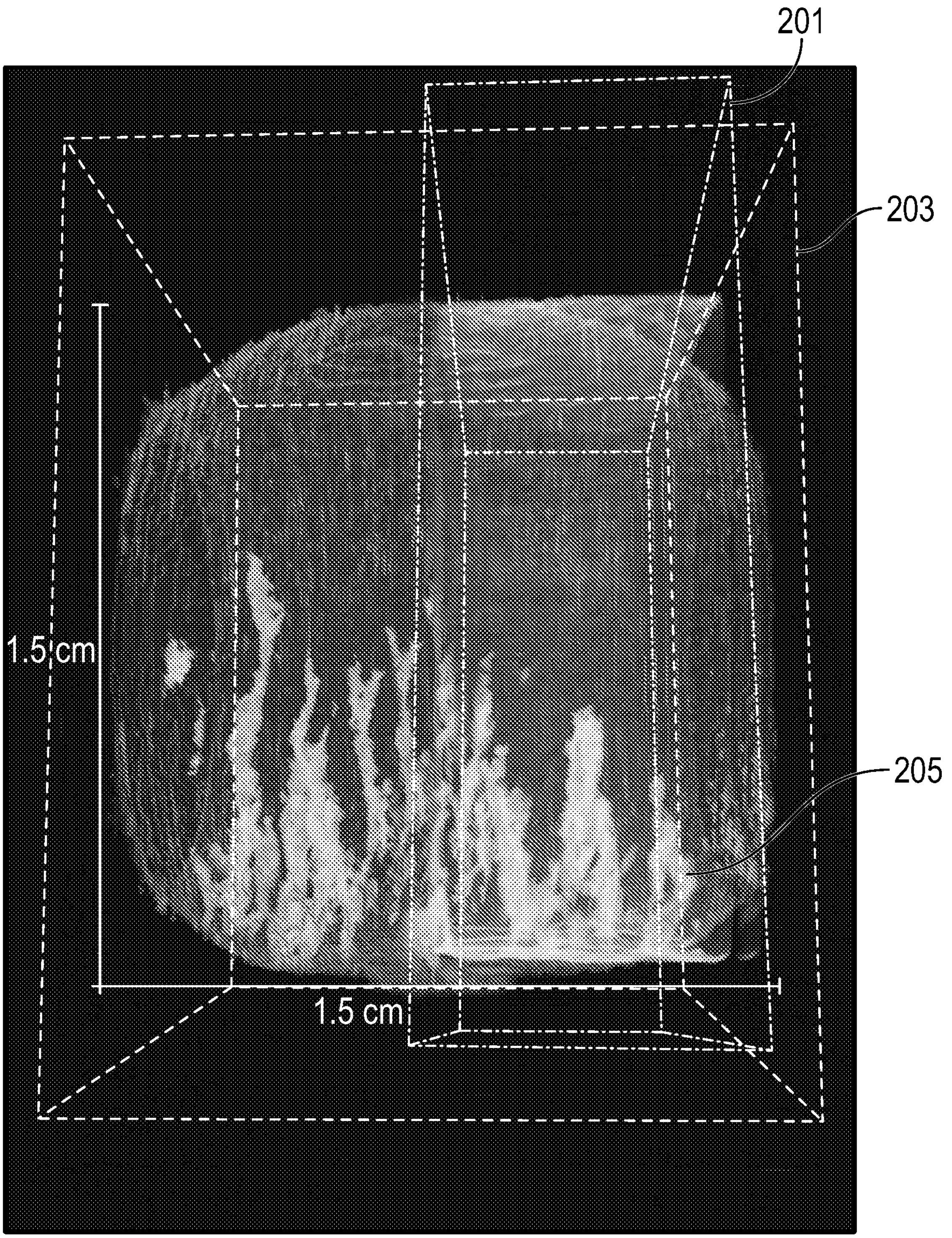
FIG. 2 shows an example of texture depicting chimney porosity structures created by an electron beam in metal additive, according to an embodiment of the present invention.

FIG. 2 shows an example of texture depicting chimney porosity structures created by an electron beam in metal additive, according to an embodiment of the present invention. A 1.5 cm cube fabricated from electron beam melted Ti—6Al-4V gas atomized powder is imaged with a combination of high-resolution neutron attenuation (203) and neutron interferometry (201). The "chimney porosity structures" (205) are created by low electron beam current at the first build layer. This work shows electron beam melted powder yields parts with intrinsic porosity leading to a unique interferometry image.

Programmable Invisible Ink (PGII). The trust anchor "ink" corresponds to porous regions within a solid additive manufactured component. Inherent porous regions in fused deposition polymer printing can have high curvature, leading to porosity between print layers. Porous regions in electron beam melting of titanium, for example, inherent with reduced e-beam current, lead to formation of "chimney structures" (205). In an embodiment, porous regions intentionally created within additive manufactured items, both polymer and metal, offer a route to embedded digital information. The porosity can be provided in a non-load bearing region of the component, for example. It is noteworthy that a programmable invisible ink introduces no foreign materials into the part and requires no modifications to the additive manufacturing printer.

Throughout the present disclosure, the term "texture" is defined as X-ray scattering structures created by intrinsic porosity variations in AM printing which are unique to a specific part and cannot be duplicated. The porosity variations shown in FIGS. 1A and 1B and FIG. 2 are example of porosity variations that are unique to that part and cannot be duplicated and are thus termed "texture." On the other hand, a texture profile is defined as X-ray scattering structures written into the part during AM printing and are characterized by larger feature size, a feature size compatible with the AM print resolution. A Cantor dust fractal can be used to illustrate large feature sizes which represent texture profile followed by smaller feature sizes which represent texture. Therefore, "texture" corresponds to porosity noise at a distance of a few tenths of microns in the AM print process and unique to each part and can be either inherent porosity or designed porosity at a feature size small enough to be susceptible to the noise or randomness of the additive manufacturing printer. On the other hand, "texture profile" corresponds to porosity written internally in the AM print process, spanning tens to hundreds of microns, and reliably printed by the additive manufacturing printer. In an embodiment, the texture profile is illustrated as Cantor dust order 2 visible in FIG. 3C and as an invisible ink in FIG. 5. In an embodiment, the texture is illustrated as Cantor dust order 3 invisible in FIG. 3C and as the texture in FIG. 5.

Porosity can be difficult to detect with conventional X-ray imaging, either two-dimensional radiography or three-dimensional CT scanning, but is easily detected with X-ray interferometry as shown in FIGS. 1A and 1B and neutron interferometry as shown in FIG. 2. The porosity in FIG. 2 can be detected with X-ray interferometry given an X-ray source with energies somewhat above 100 kV, for example, a commonly available 450 kV industrial X-ray tomography system adapted for X-ray interferometry.

Inherent texture is illustrated in fused deposition polymer printing in FIGS. 1A and 1B and in electron beam selective melting in FIG. 2. The AM print methods used in these works show that texture is inherent in the print process and can used to our advantage to uniquely fingerprint each individual part. Alternatively, the porosity can be intentionally introduced by writing small features at the limit of resolution of the printer. By writing at the printer resolution limit, the randomness or noise of the printer creates texture which uniquely fingerprints each individual part.

A void structure based on fractals is convenient for assessing additive manufacturing printer performance and the imaging capabilities of conventional and X-ray interferometry. The Cantor dust fractal in 3D is used for this work, but other fractals are also effective. In 1D, the Cantor dust fractal can be described as follows: a line segment from zero to one is divided into three equal sub-segments, the middle sub-segment is discarded, and this operation is repeated. In 3D, the Cantor dust fractal rapidly evolves from large, easily printed and imaged voids into small voids at the limit of printer performance and the detection limit of conventional X-ray imaging.

Figure 3A:
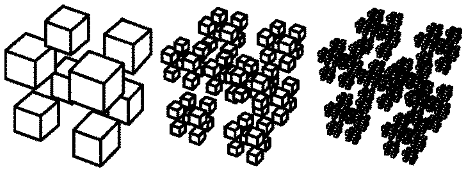
FIG. 3A shows an example of Cantor dust fractal of orders 1, 2, and 3, where order=1 creates the large features for voids, according to embodiment of the present invention.
Figure 3B:
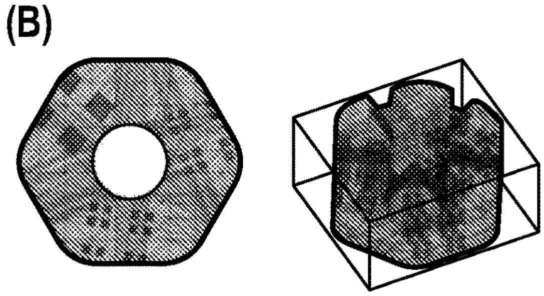
FIG. 3B shows a castle nut, shown as a wireframe drawing, containing voids in the pattern of the Cantor dust fractal, according to an embodiment of the present invention.
Figure 3C:
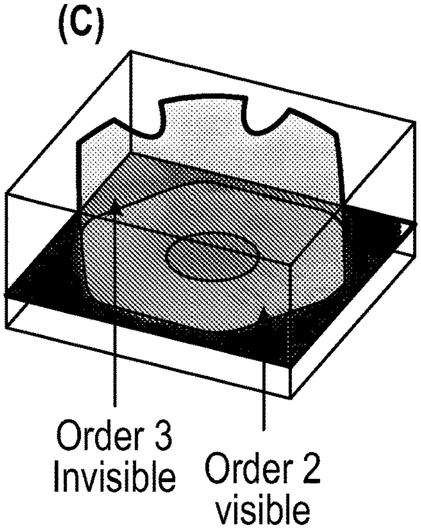
FIG. 3C shows a conventional 450 kV X-ray tomography showing clear detection of order=1 voids, and much less clear detection of order=3 voids, according to an embodiment of the present invention.

FIGS. 3A-3C illustrate a Cantor dust fractal used to determine the AM parameters for texture profile, that is the programmable invisible ink, according to embodiments of the present invention. FIG. 3A shows an example of Cantor dust fractal of orders 1, 2, and 3, where order=1 creates the large features for voids, according to embodiment of the present invention. At higher fractal orders, i.e., smaller print porosity features, the void features will transition to texture profile. FIG. 3B shows a castle nut, shown as a wireframe drawing, containing voids in the pattern of the Cantor dust fractal, according to an embodiment of the present invention. FIG. 3C shows a conventional 450 kV X-ray tomography showing clear detection of order=1 voids, and much less clear detection of order=3 voids, according to an embodiment of the present invention. However, the printer is still reliably writing the order=3 voids, and these voids can be detected by X-ray interferometry, hence order=3 is a good example of a texture profile functioning as a programmable invisible ink.

As examples of texture profile, additional exploration of porosity-based writing inside stainless steel objects is shown in FIGS. 3A-3C, now with well-defined structures for the internal voids based on a Cantor dust fractal of orders 1, 2 and 3. FIGS. 3A-3C illustrate features that can be analyzed by the present method for determining optimum additive manufacturing print parameters for printing features too small to be observed in a given part with conventional X-ray tomography. FIGS. 1A-1B and FIG. 2 show that these small features (e.g., cantor dust fractals) are observable with X-ray interferometry. Therefore, the dimensions of a high order Cantor dust fractal that cannot be detected in an additive manufactured part with conventional X-ray tomography (see, FIG. 3C) can be used as dimensions of the programmable invisible ink.

A texture profile can be features reliably written in the AM process (or other manufacturing processes) which can be viewed with X-ray interferometry, but not with conventional X-ray imaging. An example is the order=3 Cantor dust fractal in FIG. 3A. Texture is the inherent variation in the part, FIGS. 1A-1B and FIG. 2, which reflects noise or randomness in the print process. Based on the results shown in FIGS. 3A-3C, it is safe to assume that order=4 Cantor dust fractal would not be reliably written by the selective laser melting printer, and thus would be an example of intentionally created texture.

The detection of the programmable invisible ink can be done with X-ray interferometry, or in some cases, neutron interferometry.

Figure 4A:
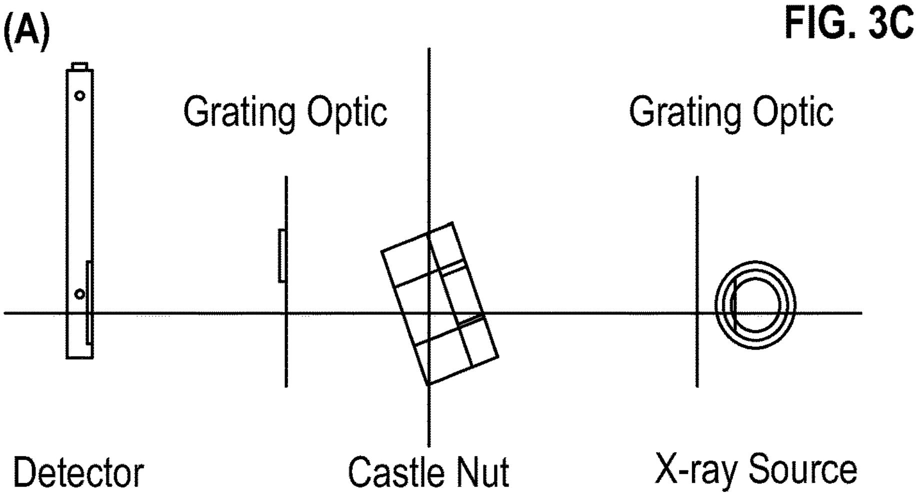
FIG. 4A is a schematic diagram of an X-ray interferometer performing the readout of the textures and texture profiles, according to an embodiment of the present invention.
Figure 4B:
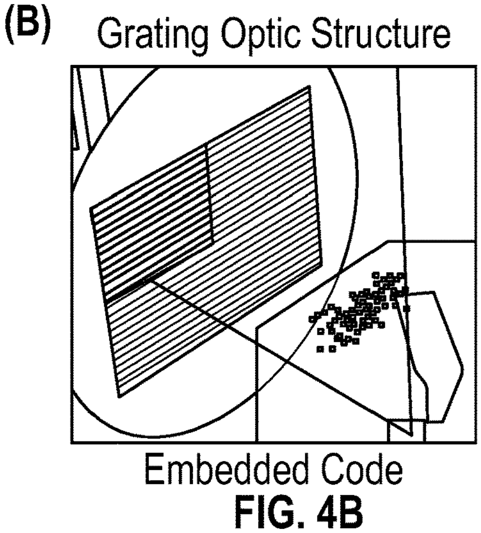
FIG. 4B depicts a grating optic structure used in the X-ray interferometer shown in FIG. 4A, according to an embodiment of the present invention.

FIG. 4A is a schematic diagram of an X-ray interferometer performing the readout of the textures and texture profiles, according to an embodiment of the present invention. A castle nut with an embedded array of cylindrical voids is imaged by the apparatus shown in FIG. 4A. The cylindrical voids are difficult to detect with conventional X-ray tomography (see, FIG. 3C), as the size will be less than 0.5% of the X-ray path length through the object. However, the X-ray scattering signal for the porous domains is a bright signal against a dark background (see FIGS. 1A-1B and FIG. 2) and are observable with a grating-based X-ray interferometer as shown in FIG. 4A. FIG. 4B depicts a grating optic structure used in the X-ray interferometer shown in FIG. 4A, according to an embodiment of the present invention. The primary interferometry readout is the X-ray scattering in the part which is a measure of the texture in the sample. Modifications to the grating optic structure and periods is part of the challenge/response imaging process. For example, the size of the texture features measured changes with the grating optics period and the position of the part in the interferometer. Also, the measured direction of the texture feature changes with the orientation of the grating optics. The connection between optics and measured part texture can be incorporated into a challenge/response security feature. In an embodiment, the interferometer inspection/imaging can be as fast as a few seconds using single-shot interferometry. Using programmable invisible ink may be superior to other methods for embedding digital information, as those methods involve additives to the print material.

Figure 5:
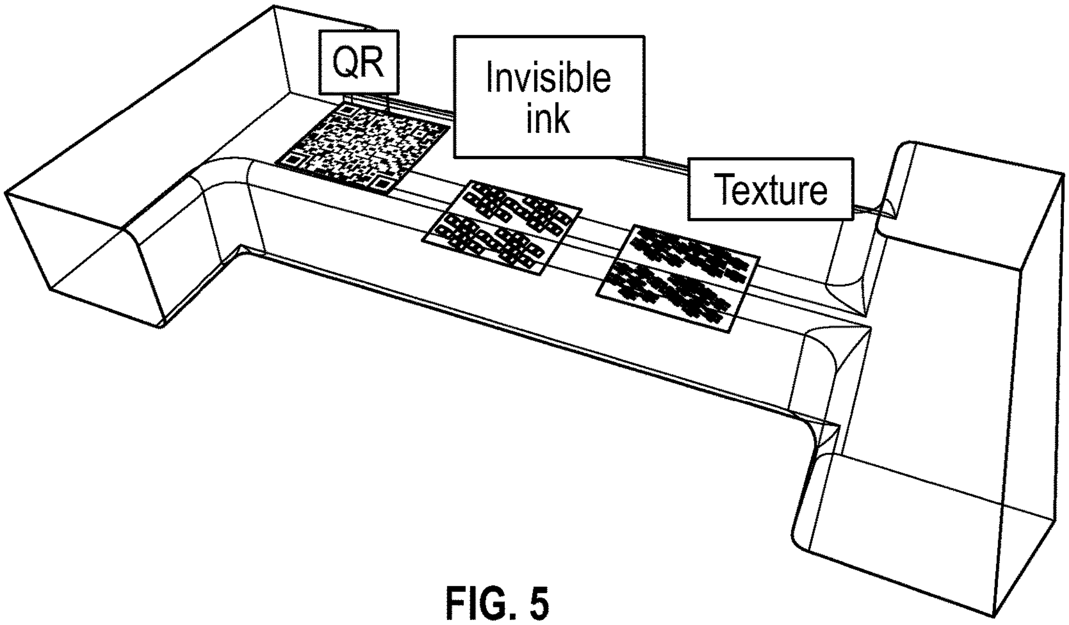
FIG. 5 shows an example test coupon having a trust anchor for high-value parts, according to an embodiment of the present invention.

FIG. 5 shows an example test coupon having a trust anchor for high-value parts, according to an embodiment of the present invention. Texture and texture profiles combined in the same object can create a unique trust anchor, along with the QR code. The example tensile test coupon illustrated in FIG. 5 has three labels: (a) a QR code that is easily readable and contains the part serial or batch number, (b) programmable invisible ink which contains digital information that can be transmitted to the blockchain via a cryptographic hash, and (c) the part's texture that is unique to this part, cannot be duplicated, and is transmitted to the blockchain as a perceptual hash.

The trust anchor can include a texture profile that is written with programmable invisible ink and stored cryptographic hash. The texture, either natural texture or texture written with very small feature sizes (such as, for example, Cantor dust fractal) can be imaged by X-ray interferometry to create a perceptual hash. With destructive analysis, the texture profile, written with invisible ink, can be detected and recreated. The texture cannot be recreated due to the random noise processes in the additive manufacturing printer and thus forms a unique fingerprint for this object.

The Cantor dust fractal can be used to assess the feature sizes of the texture profile, written with the programmable invisible ink, and the texture. The features of the texture profile written with the programmable invisible ink should be so small such that the features of the texture profile are poorly detectable by conventional X-ray CT scanning or radiography. However, the features of the texture profile are sufficiently large to be reliably written by the additive manufacturing printing and to be imaged with good fidelity by the X-ray interferometer as a two-dimensional X-ray scattering image. In other words, the user who prepares the Standard Tessellation Language (STL) print file with digital information to be written as programmable invisible ink can be assured that later X-ray interferometry inspections can reliably retrieve an exact copy of the digital information. Conversely, the texture is written with STL defined features too small to be reliably written by the additive manufacturing printer. Alternatively, no features are defined in the STL file, and the texture includes mainly the natural noise introduced by the additive manufacturing printer. Either way, a region of the part is defined as texture and is imaged with X-ray interferometry and converted to a perceptual hash.

The X-ray interferometry image of the texture profile, written with programmable invisible ink, can be converted to a cryptographic hash. The X-ray interferometry image of the texture, either natural to the part or written with programmable invisible ink at a feature size so small as to be dominated by the natural noise processes of the additive manufacturing printer, is converted to a perceptual hash.

The QR code, the cryptographic hash, and the perceptual hash together can form the trust anchor for the high value part. Immediately after printing, the high value part can be imaged with X-ray interferometry to image the texture and then create the original perceptual hash for inclusion in the digital version of the trust anchor. The other two parts, the QR code and the cryptographic hash will be confirmed by X-ray interferometry to agree with the high value part design. Ian embodiment, the QR code and cryptographic hash (QR code and invisible ink shown in FIG. 5) have high reliability for writing and reading. However, a single bit error damages the link between the part and the blockchain record, hence a confirmation read is a safe procedure. The texture (texture shown in FIG. 5 and shown in FIG. 3C as order 3 invisible) are only defined as the part is printed. The texture is imaged with interferometry to generate the perceptual hash for the blockchain.

The QR code and the cryptographic hash form the trust anchor for the commodity part: No X-ray interferometry imaging is required to create the digital version of the trust anchor: instead, the required information can be available with the commodity part designer and can be included in the STL print file.

Blockchain and Smart Contracts

Blockchains are decentralized ledgers of digitally signed transactions. The signing and consensus protocols of blockchains mean all transactions are identifiable, authentic, and non-repudiable. Blockchains allow digital information to be distributed, but not copied, meaning each individual transaction can only have one owner. This is enabled through wallets containing (multiple) asymmetric cryptographic keys that are used to sign each transaction, making all transactions identifiable and authentic. Smart contracts provide the data interface to a blockchain and are self-executing programs that can provide programmable contractual or state machine logic. From an application standpoint, however, this underlying tooling is not enough to build production-ready applications.

Figure 6:
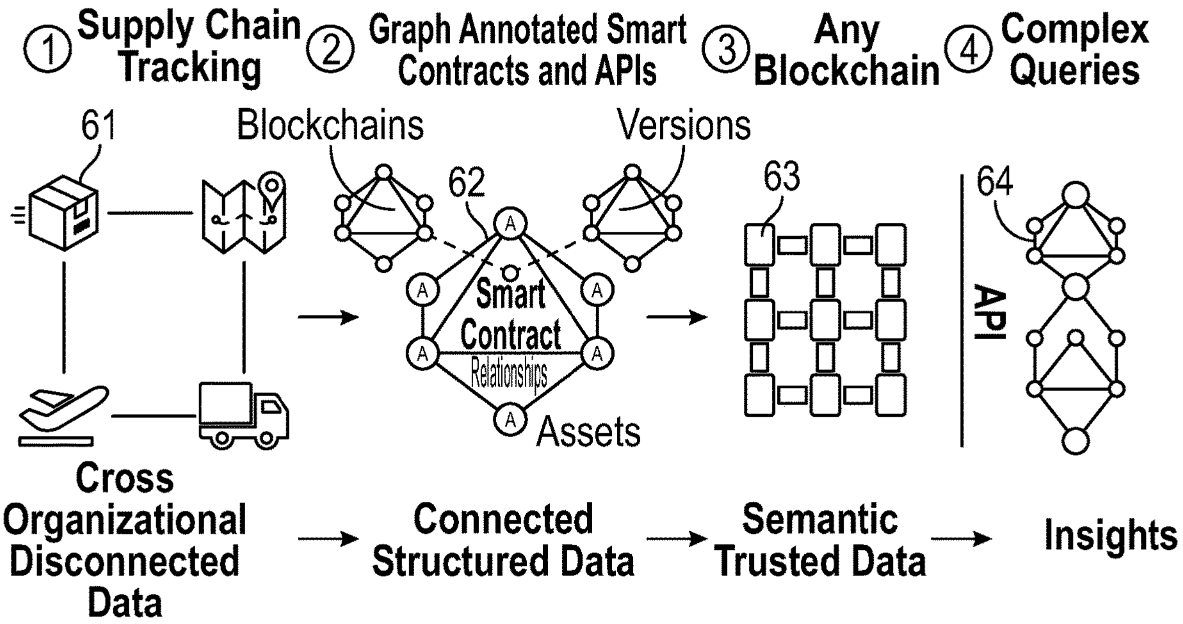
FIG. 6 depicts a Blockchain and smart contracts overview, according to an embodiment of the present invention.

An industry leading platform, a secure enterprise platform (SEP), addresses these gaps. It has a core underlying goal of providing tooling for developers to make it easy to build and deploy blockchain systems across multiple blockchains and data stores using a sustainable approach for enterprise grade applications. The SEP platform is a comprehensive, fault tolerant, secure environment that is focused on providing scalable production enterprise applications. An underlying graph-based model connects everything together by representing relationships between entities, connecting versions of smart contracts, and mapping smart contracts between different blockchains for a single application. FIG. 6 depicts a Blockchain and smart contracts overview; according to an embodiment of the present invention. FIG. 6 illustrates this concept by showing how the SEP platform is used to track parts on a simple supply chain using the approach described.

Data from the supply chain (61) interfaces through smart contracts (62) and customized applications before being stored on the underlying blockchain (63). The SEP platform applies the use of a model to annotate smart contracts with data relationships between the tracked assets and the methods whereby those assets are being tracked. In this case an asset (i.e., high value or commodity part) is being tracked across geographical areas and different models of transport.

The relationships among the assets and how these transactions are tracked are specified using a graphical tool, and a smart contract is generated as a result. This process results in a graph being stored on the ledger that provides structure to the data and gives the necessary semantics so that the data can be interpreted using graph queries (64) to gain insights into the stored data. The graph extends further by connecting smart contract versions together and even to connecting smart contracts across multiple blockchains for a single application to provide true sustainability for production applications.

The SEP platform model can be used to track the CAD file, the manufactured component, its associated identifiers, and the movement of that part across the supply chain throughout the lifetime of the component. Using the digital information that is deterministically generated for each component, the AM component can be tied back or linked to its physical characteristics when printed, securing the component and eliminating the possibility of counterfeiting.

Figure 7:
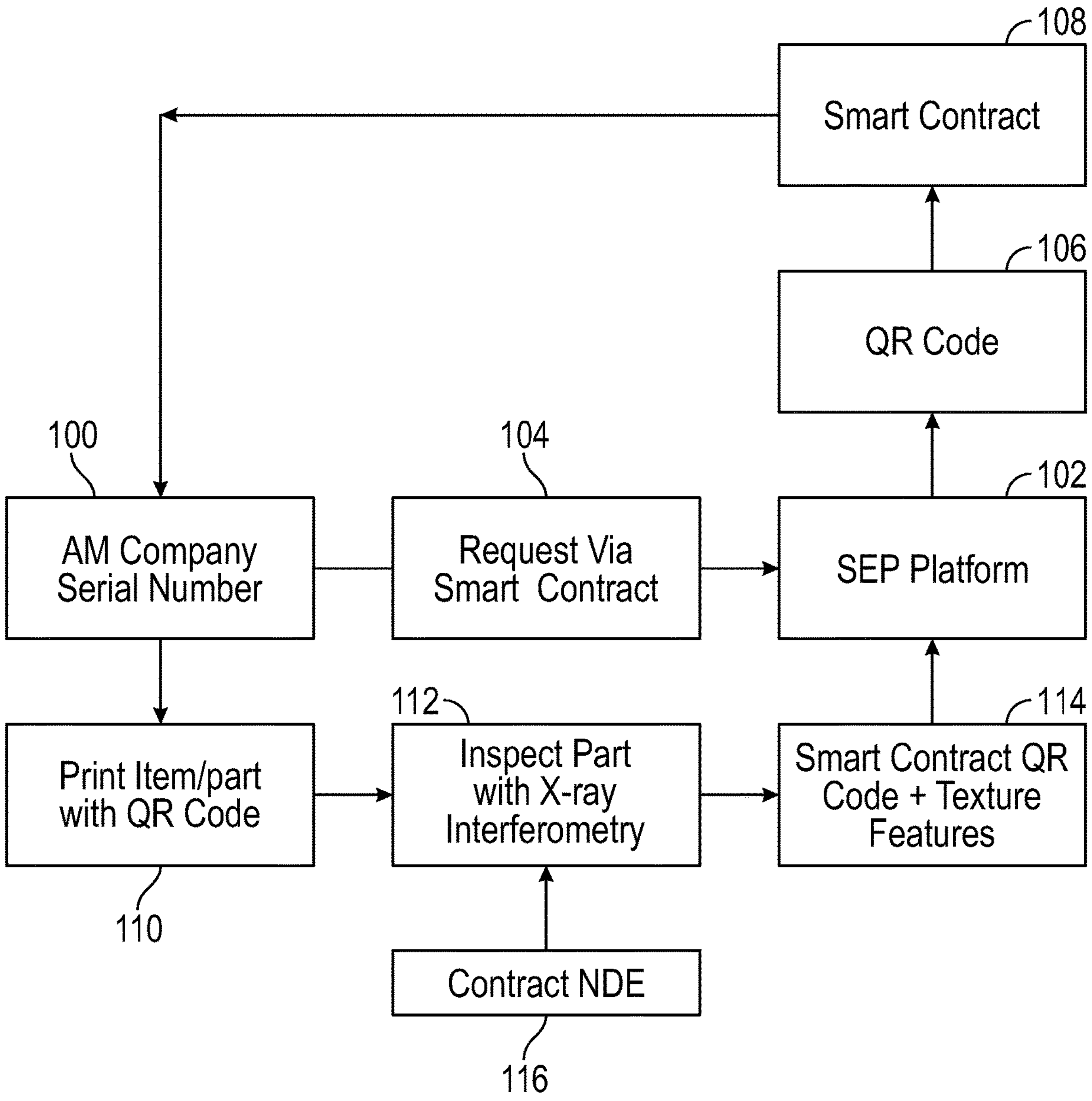
FIG. 7 shows a flow diagram of a method of implementing a trust anchor with QR code, according to an embodiment of the present invention.

Implementation of a trust anchor with QR, texture profile, and/or texture for high-value parts can occur through different methods as disclosed herein. For example, an embedded texture profile can be written with programmable invisible ink (see FIGS. 3A-3C and FIG. 5) and read out as a cryptographic hash. In addition, additional texture, as in FIG. 5, can be read out as a perceptual hash, and embody texture, with the intrinsic variation of porosity set at a few tenths of microns. FIG. 7 shows a flow diagram of a method of implementing a trust anchor with QR code, according to an embodiment of the present invention. Although a QR code is referred herein throughout, it must be appreciated that any type of geometrical code can be used such as a barcode (1D code), QR code (2D code) or other types of codes. As illustrated:

1. The AM company 100 generates a serial number, and sends a request to the SEP platform 102, via smart contract 104, for a blockchain initialization (blockchain pointer).
2. The SEP platform 102 generates a QR code 106 containing at least the serial number and the blockchain pointer and returns the QR code 106, via smart contract 108, to the AM company 100 and awaits texture information about the part.
3. The AM company 100 prints the item with the QR code 106 embedded within the part as texture, at 110. The part is inspected with X-ray interferometry to measure the texture, at 112. The AM company 110 sends, via smart contract, the QR code 106 and texture features, at 114, as a perceptual hash back to the SEP platform 102. The SEP platform 102 completes the blockchain entry initialization.
4. Maintenance and ownership changes: A contracted Non-Destructive Evaluation (NDE) company 116 inspects the part with X-ray interferometry and images the QR code 106, the texture profile, and the texture, at 112 and sends, via smart contract, the serial number, the cryptographic hash, and the perceptual hash 114 back to the SEP platform 102.

5 The SEP platform 102 performs serial number lookup, cryptographic hash matching, and calculates the Hamming or Euclidean distance of the perceptual hash. A small Hamming or Euclidean distance indicates an authentic part, and a large Hamming or Euclidean distance means a counterfeit part. If the part is authentic, the blockchain is updated with provenance. If the part is counterfeit, a forensic investigation may begin.

6. End-of-life. A contracted NDE 116 company inspects with X-ray interferometry and sends the serial number, the cryptographic hash, the perceptual hash, and end-of-life statement back to the SEP platform 102. This updates blockchain with end-of-life provenance.
7. The assignment of a small and large Hamming or Euclidean distances is developed with test articles printed and imaged. Consider a set of test articles as shown in FIG. 5 with part serial numbers #001, #002, and #003. The perceptual hashes created by repeated imaging of #001 are very similar. However, the perceptual hash of #001 is very different from the perceptual hash of #002 and #003.

Implementation of Trust Anchor with QR and Texture Profile for Commodity Parts.

The trust anchor life cycle envisioned for commodity products consists of one smart contract exchange for blockchain initiation followed by on-demand X-ray interferometry for product authentication. The implementation of the trust anchor for commodity parts is designed to be less costly than for high value parts based on the elimination of texture from the trust anchor and the reduction of X-ray interferometry inspection to an on-demand service.

1. The AM company 100 requests from the SEP platform 102, via smart contract 108, a blockchain initialization. The AM company 100 supplies a batch number and the specifications for an embedded texture profile that will be used in printing.
2. AM company 100 prints the batch with external batch number and internal texture profile, at 110. The batch items are packaged with:
   (a) The batch number is visible on the outside of package.
   (b) The packaging material is compatible with 2D X-ray interferometry imaging.
   (c) The batch items are arranged in 2D grid within package for imaging without opening the package.
3. On-demand inspection for authenticity
   (a) A contracted nondestructive evaluation (NDE) company 116 accepts the intact package for 2D X-ray interferometry, at 112.
   (b) The NDE company 116 sends the batch number to the SEP platform 102 via smart contract 114 and requests the texture inspection profile.
   (c) With the texture inspection profile, the NDE company 116 performs 2D interferometry on the intact package, then sends the texture profile as a cryptographic hash to the SEP platform 102.
   (d) The SEP platform 102 compares the cryptographic hash as measured with the cryptographic hash as contained in the original print file, and then reports a binary result, either match or does not match.

Implementation of Trust Anchor with QR and Texture for Legacy Parts.

Where a legacy part known to be authentic is brought into the secure supply chain by creation of a trust anchor based upon the part's inherent texture. In our experience, cast metal parts have some inherent texture. In this case, the texture is read out as a perceptual hash and linked to the part's existing serial number. A new QR code is created, clearly visible, to encode the existing serial number and the blockchain pointer.

1. The owner of the legacy part asserts to SEP platform 102 the part's authenticity and provides the part's serial number via smart contract to the SEP platform 102.

2. The SEP platform 102 generates the QR code 106 containing at least the serial number and the blockchain pointer and returns the QR code 106, via smart contract 108, to the part's owner and awaits texture information about the part.
3. The part is inspected with X-ray interferometry by a contracted NDE company 116 to measure the texture, at 112. The X-ray interferometer operator sends, via smart contract, the QR code and texture features, at 114, as a perceptual hash back to the SEP platform 102. The SEP platform 102 completes the blockchain entry initialization.
4. Maintenance and ownership changes: A contracted NDE company 116 inspects the part with X-ray interferometry and images the QR code and the texture and sends, via smart contract, the serial number and the perceptual hash back to the SEP platform 102.
5. The SEP platform 102 performs serial number lookup and calculates the Hamming or Euclidean distance of the perceptual hash. A small Hamming or Euclidean distance indicates an authentic part, and a large Hamming or Euclidean distance means a counterfeit part. If the part is authentic, the blockchain is updated with provenance. If the part is counterfeit, a forensic investigation may begin.
6. End-of-life: A contracted NDE company 116 inspects with X-ray interferometry, at 112, and sends the serial number, the perceptual hash, and end-of-life statement back to the SEP platform 102. This updates blockchain with end-of-life provenance.

Figure 8:
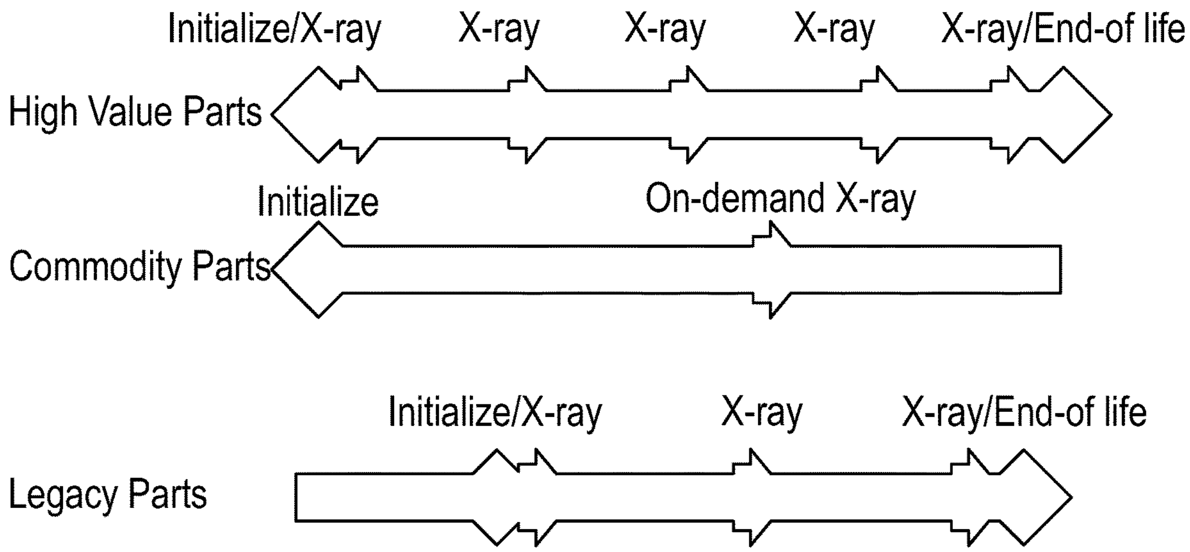
FIG. 8 shows a timeline of fabrication and inspection for high value, commodity, and legacy parts, according to an embodiment of the present invention.

The timelines of fabrication and X-ray interferometry inspection can be different for the three categories of high value, commodity, and legacy parts, as shown in FIG. 8. FIG. 8 shows a timeline of fabrication and inspection for high value, commodity, and legacy parts, according to an embodiment of the present invention. For the high value and legacy parts, the necessity of provenance may require frequent inspection. For the commodity parts, the objective of low-cost implementation means X-ray inspection is an on-demand service.

The aim of incorporating physical features, such as texture or texture profile, is to capture attributes of the part that are distinct to the part itself, rather than the part's design, and convert those physical features into a unique code (e.g., bit-code) that can be compared with bit-codes securely stored and attached to an audit trail. A feature can then be consistently and reproducibly converted to a unique bit-code qualifies as texture profile and can be converted into cryptographic hash. Comparison of the cryptographic hash of a part with the stored cryptographic hash yields a binary answer for part authenticity. A feature that, due to imaging noise, yields an image that varies slightly from image to image can be converted to a perceptual hash. Comparison of the perceptual hash of a part with the stored perceptual hash yields a Hamming or Euclidean distance which can be interpreted as a probability of part authenticity.

Figure 9:
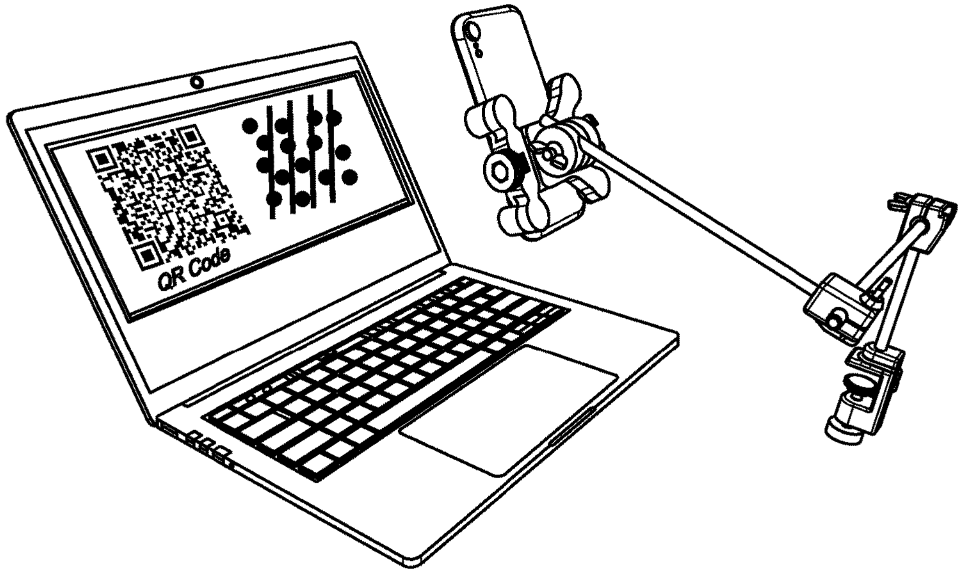
FIG. 9 depicts a demonstration of challenge/response trust anchor readout, according to an embodiment of the present invention.

FIG. 9 depicts a demonstration of challenge/response trust anchor readout, according to an embodiment of the present invention. The Trust Anchor Demonstration (TAD) system illustrated includes a laptop and cell phone combined with a printed transparency film and customized software. In this example, the TAD simulates the challenge/response by a time-varying laptop screen illumination process: the challenge/response will be accomplished in the interferometer with time-varying optics positioning. The physical elements include a laptop, website, cell phone holder, and transparency film samples, as shown in FIG. 9. In an embodiment, the transparency film is laying on the computer (e.g., laptop) screen and has the QR code and the texture, shown as dots, printed on the transparency film. The time-varying laptop screen illumination is shown as the grid lines, moving, across the laptop display.

The transparency films are printed as either authentic or counterfeit, with any number of counterfeit samples prepared by the customer using the supplied program file and detailed instructions on how to counterfeit the transparency film. The software includes a smart contract to specify the data details, which are generated by the cloud-based, SEP. The TAD focuses on steps 4 and 5 above in the trust anchor life cycle of a high value part, i.e., the repetitive steps of ownership change and validation of the supply chain. In an embodiment, an authentic part shows a cryptographic hash that matches a blockchain entry and a perceptual hash that is similar to the perceptual hash associated with that entry. A counterfeit part can be created by the customer, for example, by cutting two transparency films, swapping halves, and taping. However, in this case, the texture is not matched with the QR code. Imaging the counterfeit film will yield a match for the cryptographic hash but will fail to yield a good match for the perceptual hash.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

The above described methods can be duplicated or more within a single part. This has the effect of aligning pairs of hashes in the X-ray interferometry beam, then taking advantage of the extreme sensitivity of interferometry to distance and angular changes. The result is a defense against removal of trust anchors from an authentic part and re-installation onto a sabotaged or counterfeit part.

The above methods can also be modified for commodity parts by reduction to only a QR code and a cryptographic hash. The workflow is then reduced from part fabrication with the cryptographic and perceptual hashes followed by initial X-ray interferometry to a workflow consisting only of part fabrication with the cryptographic hash, and no immediate X-ray interferometry. This reduced workflow is designed to meet the needs of commodity parts. Part authenticity is then established by on-demand X-ray interferometry of a batch of commodity parts. Moreover, with suitable packaging, the on-demand inspection can be done with the commodity parts still contained within their shipping and sales containers.

The above methods can be modified for legacy parts by reduction to only a QR code and a perceptual hash. The workflow is then assertion of part authenticity by the part's owner, creation of a QR code with serial number and blockchain pointer, and X-ray interferometry of a portion of the legacy part to observe texture, and from this texture to create a perceptual hash to be attached to the blockchain record. The perceptual hash from the trust anchor can provide probability of authenticity when compared with the perceptual hash attached to the blockchain record. The comparison of the two perceptual hashes can, for example, be done with a Hamming or Euclidean distance calculation.

The 3D arrangement of porosity within the additive manufacture part can be read as binary data in a large number of bit stream orders. One parameter affecting the bitstream readout order is the orientation of the additive manufacture part relative to the coordinate system of the X-ray interferometer. A reasonable number of useful orientations is on the order of twenty. A second parameter affecting the bitstream readout order is the interferometry autocorrelation scattering length, a parameter determined by the interferometry optics, X-ray energy, and position of the AM component in the interferometer. A reasonable number of useful scattering length is on the order of 4. A third parameter affecting the bitstream readout order is the microfabrication pattern of the interferometry optics. A reasonable number of different patterns exceeds 210=1024.

Each part can have a serial number and the serial number list can be secured. Preferably, new serial numbers cannot be inserted into the secure database. When maintenance sites perform selective readout of the part serial number, and then uploads the serial number to the provenance database, this transaction can be three-way authenticated and logged.

The components discussed above can be recast as "good", "better", and "best" levels of security and corresponding implementation costs. The preceding discussion corresponds to the "best" based on the programmable invisible ink, X-ray interferometry, and challenge-response imaging. Our recent real-world experience with establishing a secure supply chain for coffee beans from farmer to restaurant indicates very simple trust anchors, such as mass of coffee bean bag and moisture content, can provide sufficient security for some applications. In the coffee bean project, an external QR code on the bag, combined with coffee bean bag mass and moisture content, are equivalent to the serial number and texture, and the cryptography and perceptual hashes, respectively. The coffee bean workflow naturally includes weighing bags and measuring bean moisture content, hence the additional cost to incorporate this data into blockchain is minor. Yes, over the nearly two years of real-world experience, the coffee bean supply chain has been secure, as measured by a more than four-fold income increase to the farmer at the head of the supply chain.

The recast of a cyber-physical trust anchor as "good" can be envisioned as an external serial number and an internal texture profile as shown schematically in FIG. 3A with order equal to two, for example. As described earlier, a texture profile can be written reliably and read-out reliably. For the "good" trust anchor, the read-out is envisioned with conventional X-ray radiography. The concept behind a "good" trust anchor is extremely low cost of implementation: the serial number is an existing component of the workflow, and a written texture profile is a small addition to fabrication, using existing tooling and materials. The blockchain is updated with serial number (the cryptographic hash) and the texture profile (the perceptual hash). The X-ray read-out is shown in FIG. 7 for the commodity part, the on-demand X-ray imaging. For additive manufacturing and conventional manufacturing, the insertion of an internal texture profile and on-demand conventional X-ray imaging creates a similar deterrence to attack of the supply chain.

A truth table can be introduced to guide the calculation of part authenticity. The combinations of good, better, best security levels with cryptographic and perceptual hashes can be presented as truth tables, much like the logical truth tables used for binary logical operations. First, the cryptographic hash measured for the part can be compared with the cryptographic hash stored on blockchain: if there is a positive match, the system can proceed to the next comparison. The perceptual hash measured for the part is compared with the perceptual hash stored on blockchain: a Hamming or Euclidean distance is computed. If the distance is small, the probability of part authentication is high. If the distance is large, then the part authenticity is low.

The good, better, best security levels represent a range of perceptual hash mechanisms. The "good" uses written texture profiles measured with conventional X-ray imaging. The "best" use both uses written texture profiles and textures measured with X-ray interferometry. The "better" uses a blend of written texture profiles and measured textures using conventional X-ray imaging. The range of good, better, best security levels can match security with the attack threats and desired security level. The range of good, better, best security levels have a range of implementation costs, costs that can be matched with the costs of a compromised security chain.

Secure Database

In some configurations there can be one unique and secure database of valid serial numbers that is backed up in compliance with organizational cyber security disaster recovery and business continuity policies and system technology accreditation audit requirements. Associated with each serial number can be a Job ID, a CAD file identifier, and part provenance (owner, maintenance times and locations), a cryptographic hash, and/or one or more perceptual hashes. The option for multiple, redundant enables a strategy to increase the accuracy of the proof of authenticity calculation based upon multiple Hamming or Euclidean distance calculations.

As discussed above, an aspect of the present invention is to provide a method for providing an identification mark in a structure. FIG. 10 is flow diagram of the method for providing an identification mark in a structure, according to an embodiment of the present invention. The method includes providing a customized programmable invisible ink onto a selected area of the structure by using an inherent porosity or intentionally added porosity to the selected area of the structure, at 202. The pores are smaller than can be imaged with X-ray radiography or CT scanning. The method further includes converting the porosity of the customized programmable invisible ink to a digital data and storing the digital data in a data file, at 204. The method also includes reading using X-ray interferometry the customized programmable invisible ink, at 206.

In an embodiment, providing the customized programmable invisible ink onto the selected area of the structure includes determining a size of the porosity of the customized programmable invisible ink from a test object and a fractal of the porosity regions.

In an embodiment, the method further includes testing a range of sizes of the porosity using a Cantor dust fractal.

In an embodiment, providing the customized programmable invisible ink onto the selected area of the structure includes providing the porosity such that a size of the porosity is smaller than a size of features detectable with conventional X-ray imaging.

In an embodiment, providing the customized programmable invisible ink includes printing a feature by introducing added porosity to the selected area of the structure.

In an embodiment, printing the feature by introducing added porosity to the selected area of the structure includes printing the feature using existing AM printers.

In an embodiment, printing the feature by introducing added porosity to the selected area of the structure includes aligning pairs of hashes using an X-ray interferometry beam.

In an embodiment, the method further includes forming an identification mark with the customized programmable invisible ink using manufacturing processes other than additive manufacturing.

In an embodiment, the structure includes an automotive part. In an embodiment, the automotive part includes a sparkplug having a drawn copper rod encased in a ceramic insulator.

Figure 11:
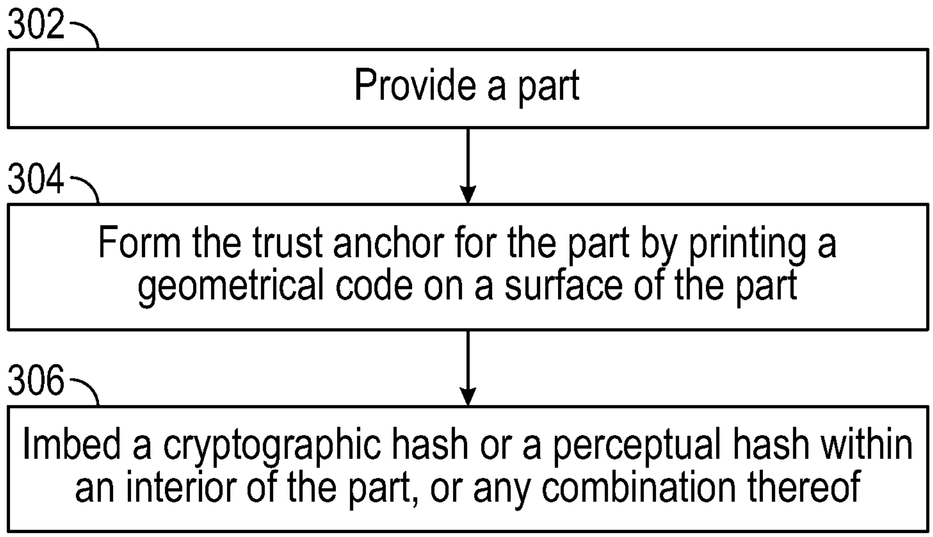
FIG. 11 is a flow diagram of a method for forming a trust anchor for a part, according to an embodiment of the present invention.

Another aspect of the present invention is to provide a method for forming a trust anchor for a part. FIG. 11 is a flow diagram of a method for forming a trust anchor for a part, according to an embodiment of the present invention. The method includes providing the part, at 302, and forming the trust anchor for the part by printing a geometrical code on a surface of the part, at 304. The method further includes imbedding a cryptographic hash or a perceptual hash within an interior of the part, or any combination thereof, at 306.

In an embodiment, printing the geometrical code on the surface of the part includes printing a QR code on the surface of the part.

In an embodiment, the QR code contains a model and serial linking of the trust anchor to a particular blockchain.

In an embodiment, imbedding the cryptographic hash includes obscuring the cryptographic hash from plain view using a programmable invisible ink.

In an embodiment, imbedding the cryptographic hash includes imbedding the cryptographic hash to provide binary assurance of part authenticity when compared with a cryptographic hash attached to a blockchain record.

In an embodiment, imbedding the perceptual hash includes imbedding the perceptual hash to provide proof of part authenticity when compared with a perceptual hash attached to a blockchain record.

In an embodiment, the method further includes comparing the perceptual hash with the perceptual hash associated with the blockchain record using a Hamming or Euclidean distance calculation.

Figure 12:
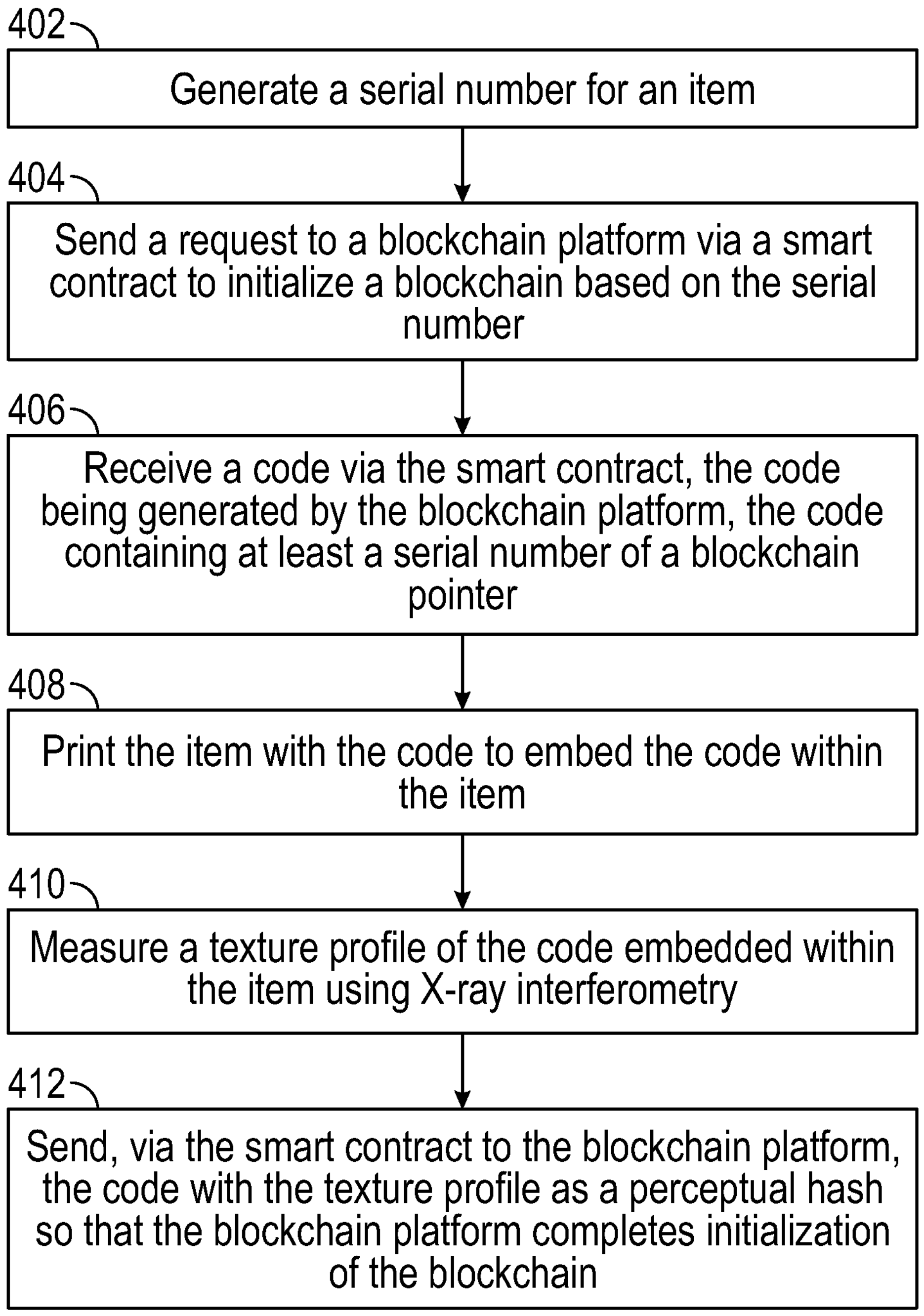
FIG. 12 is a flow diagram of the method for registering and authenticating an item on a blockchain platform, according to an embodiment of the present invention.

Another aspect of the present invention is to provide a method for registering and authenticating an item on a blockchain platform. FIG. 12 is a flow diagram of the method for registering and authenticating an item on a blockchain platform, according to an embodiment of the present invention. The method includes generating a serial number for an item, at 402: sending a request to a blockchain platform via a smart contract to initialize a blockchain based on the serial number, 404: receiving a code via the smart contract, the code being generated by the blockchain platform, the code containing at least a serial number of a blockchain pointer, at 406: printing the item with the code to embed the code within the item, at 408: measuring a texture profile of the code embedded within the item using X-ray interferometry, 410; and sending, via the smart contract to the blockchain platform, the code with the texture profile as a perceptual hash so that the blockchain platform completes initialization of the blockchain, at 412.

In an embodiment, the method further includes inspecting the item with X-ray interferometry by imaging the texture profile printed on the item; and sending, via a smart contract, the serial number, a cryptographic hash and the perceptual hash back to the blockchain platform.

In an embodiment, the method further includes performing, by the blockchain platform, serial number lookup, cryptographic hash matching; and calculating a Hamming or Euclidean distance of the perceptual hash.

In an embodiment, the method further includes determining authenticity of the item. A small Hamming or Euclidean distance indicates an authentic item and a large Hamming or Euclidean distance indicates a counterfeit item.

In an embodiment, when the item is determined to be authentic, updating the blockchain with a provenance of the item, and when the item is determined to be counterfeit initiating a forensic investigation.

In an embodiment, the method further includes when the item reaches end-of-life cycle, inspecting the item with X-ray interferometry and sending the serial number, the cryptographic hash, or the perceptual hash to the blockchain platform.

In an embodiment, receiving the code via the smart contract includes receiving a QR code via the smart contract.

In an embodiment, sending the request to the blockchain platform via the smart contract to initialize the blockchain based on the serial number includes sending the request to a secure enterprise platform via the smart contract to initialize the blockchain based on the serial number.

Figure 13:
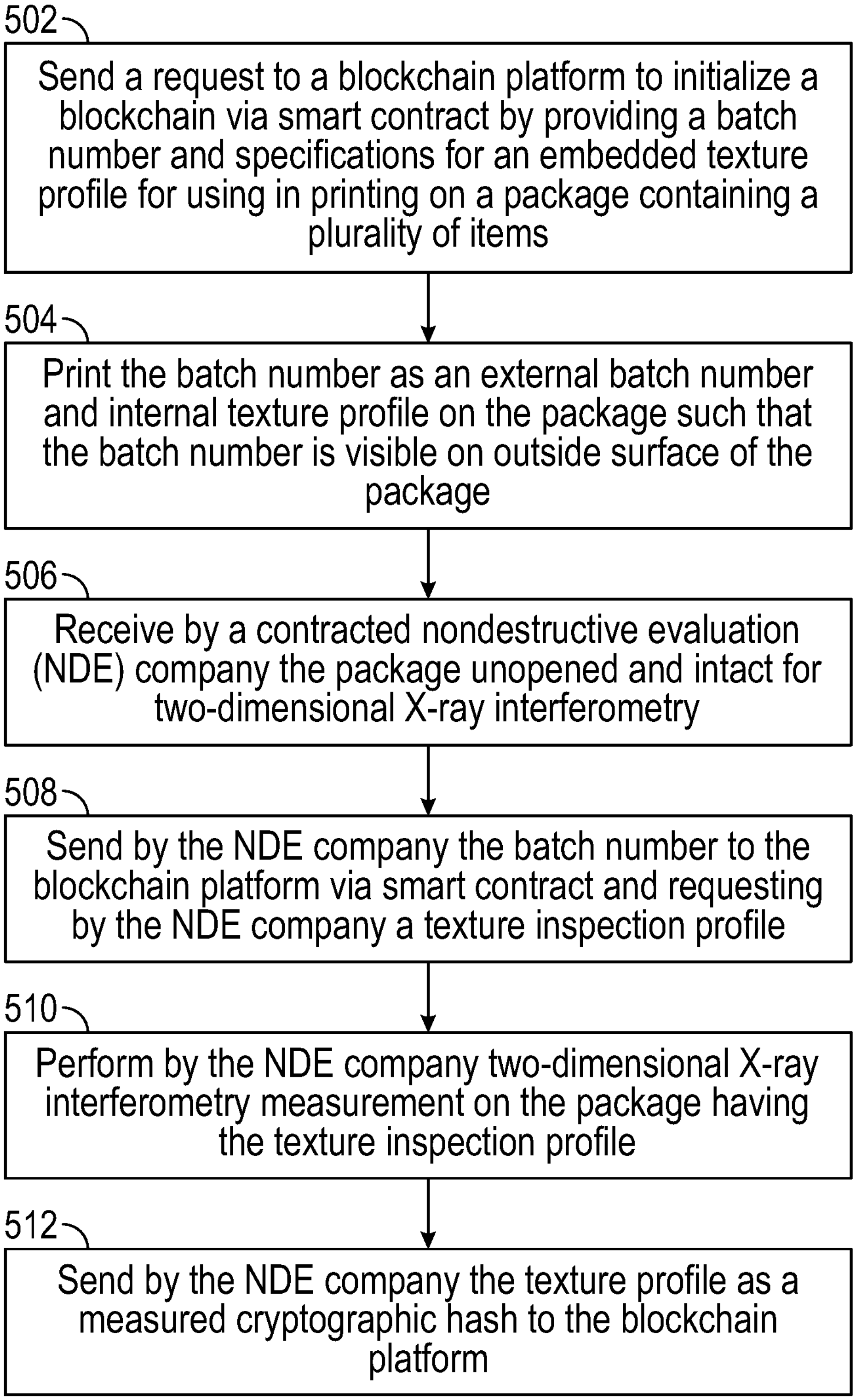
FIG. 13 is a flow diagram of a method of authenticating an item, according to an embodiment of the present invention.

Another aspect of the present invention is to provide a method of authenticating an item. FIG. 13 is a flow diagram of a method of authenticating an item, according to an embodiment of the present invention. The method includes sending a request to a blockchain platform to initialize a blockchain via smart contract by providing a batch number and specifications for an embedded texture profile for using in printing on a package containing a plurality of items, at 502: printing the batch number as an external batch number and internal texture profile on the package such that the batch number is visible on outside surface of the package, at 504: receiving by a contracted nondestructive evaluation (NDE) company the package unopened and intact for two-dimensional X-ray interferometry, at 506: sending by the NDE company the batch number to the blockchain platform via smart contract and requesting by the NDE company a texture inspection profile, 508: performing by the NDE company two-dimensional X-ray interferometry measurement on the package having the texture inspection profile, at 510; and sending by the NDE company the texture profile as a measured cryptographic hash to the blockchain platform, at 512.

In an embodiment, the method according further includes comparing by the blockchain platform the measured cryptographic hash with the cryptographic hash as contained in an original print file; and reporting a binary result as either matching or not matching.

In an embodiment, a material of the package is compatible with 2D X-ray interferometry imaging.

In an embodiment, the plurality of items in the package are arranged in a two-dimensional grid within the package for imaging without opening the package.

In an embodiment, sending the request to the blockchain platform to initialize the blockchain via smart contract includes sending the request to a secure enterprise platform to initialize the blockchain via smart contract.

Figure 14:
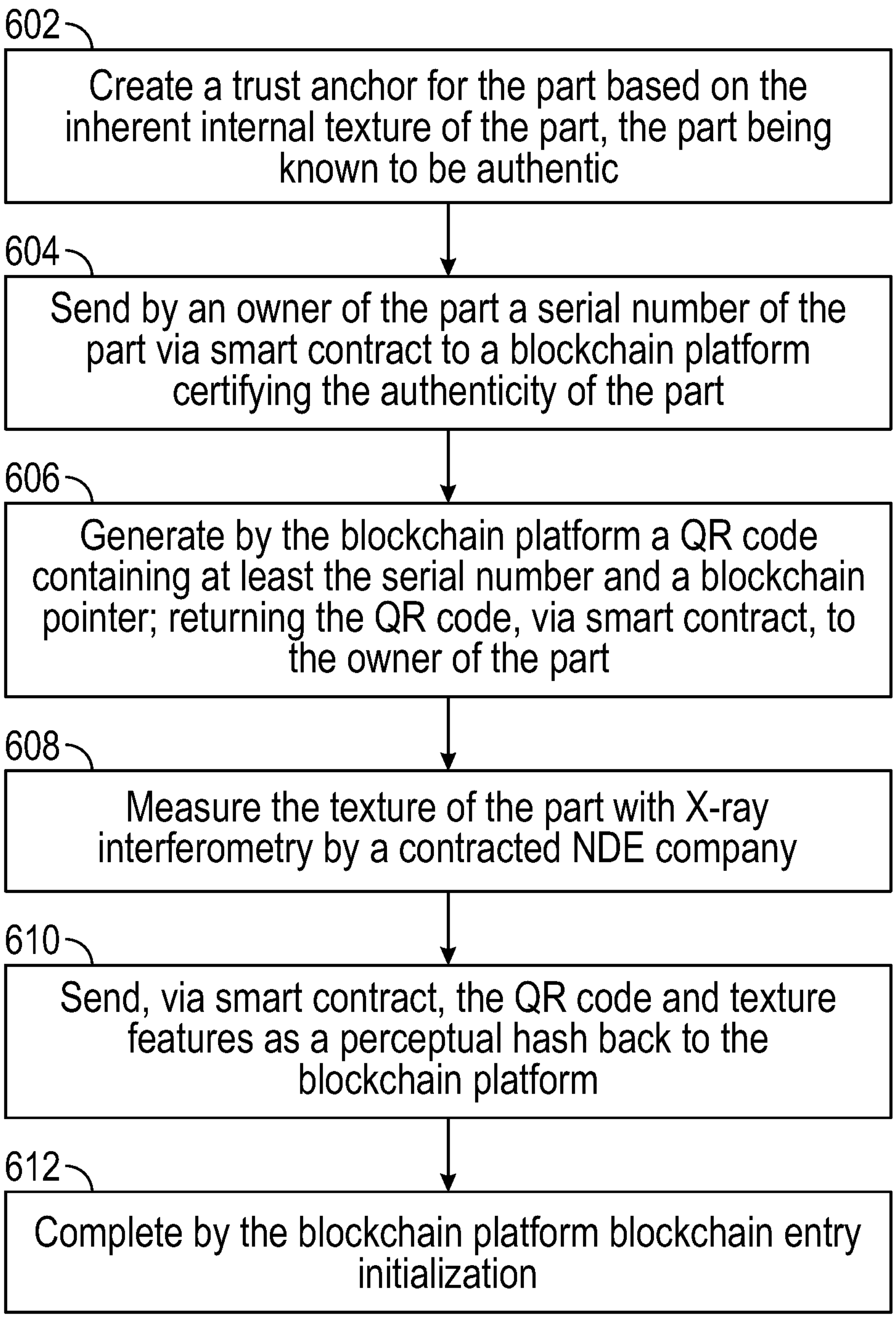
FIG. 14 is a flow diagram of a method for authenticating a legacy part using an inherent internal texture of the legacy part, according to an embodiment of the present invention.

Another aspect of the present invention is to provide a method for authenticating a legacy part using an inherent internal texture of the legacy part. FIG. 14 is a flow diagram of a method for authenticating a legacy part using an inherent internal texture of the legacy part, according to an embodiment of the present invention. The method includes creating a trust anchor for the part based on the inherent internal texture of the part, the part being known to be authentic, at 602: sending by an owner of the part a serial number of the part via smart contract to a blockchain platform certifying the authenticity of the part, at 604: generating by the blockchain platform a QR code containing at least the serial number and a blockchain pointer: returning the QR code, via smart contract, to the owner of the part, at 606: measuring the texture of the part with X-ray interferometry by a contracted NDE company, at 608: sending, via smart contract, the QR code and texture features as a perceptual hash back to the blockchain platform, at 610; and completing by the blockchain platform blockchain entry initialization, at 612.

In an embodiment, the method further includes inspecting the part with X-ray interferometry by the NDE company and imaging the QR code and the texture; and sending, via smart contract, the serial number and the perceptual hash back to the blockchain platform.

In an embodiment, the method further includes performing by the blockchain platform a serial number lookup to determine whether the part is an authentic part or a counterfeit part; and calculating a Hamming or Euclidean distance of the perceptual hash.

In an embodiment, when a small Hamming or Euclidean distance is determined this indicates that the part is an authentic part, and when a large Hamming or Euclidean distance is determined this indicates the part is a counterfeit part.

In an embodiment, when the part is authentic, the blockchain is updated with provenance, and when the part is counterfeit, a forensic investigation is initiated.

In an embodiment, upon a determination of an end cycle of the part, a contracted NDE company inspects with X-ray interferometry and sends the serial number, the perceptual hash, and end-of-life statement back to the blockchain platform and updates blockchain with end-of-life provenance.

In an embodiment, the part is metallic and has inherent texture, the inherent texture is measured and read out as a perceptual hash and linked to the part's existing serial number.

In an embodiment, the created code is visible and encodes the existing serial number and the blockchain pointer. In an embodiment, the code includes a QR code.

Figure 15:
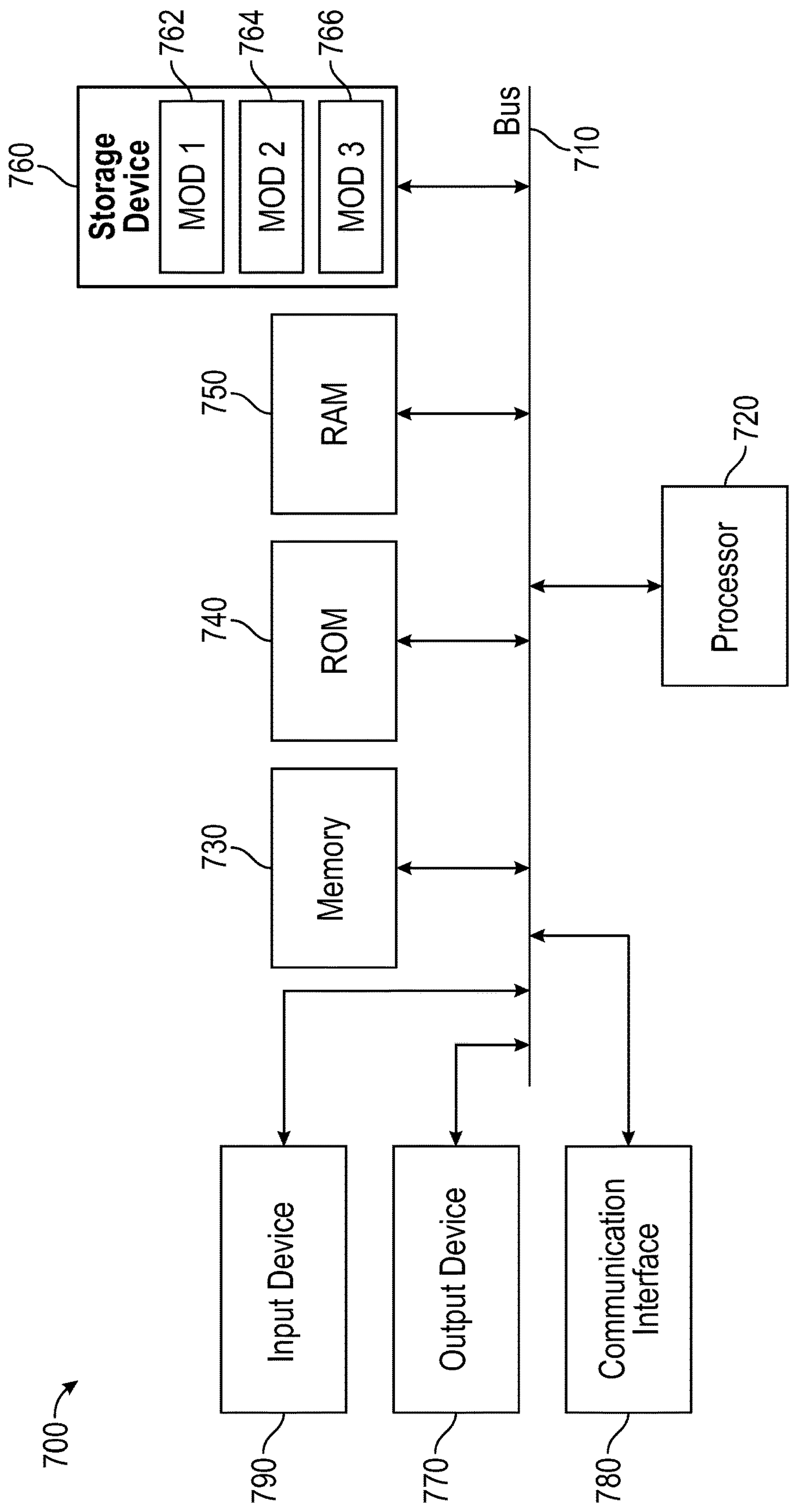
FIG. 15 is a schematic diagram of a computer system for implementing the methods, according to an embodiment of the present invention.

With reference to FIG. 15, an exemplary system includes a general-purpose computing device 700 that is configured to implement any of the methods provided in the above paragraphs. The computing device 700 includes a processing unit (CPU or processor) 720 and a system bus 710 that couples various system components including the system memory 730 such as read-only memory (ROM) 740 and random access memory (RAM) 750 to the processor 720. The system 700 can include a cache of high-speed memory connected directly with, in close proximity to, or integrated as part of the processor 720. The system 700 copies data from the memory 730 and/or the storage device 760 to the cache for quick access by the processor 720. In this way, the cache provides a performance boost that avoids processor 720 delays while waiting for data. These and other modules can control or be configured to control the processor 720 to perform various actions. Other system memory 730 may be available for use as well. The memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general purpose processor and a hardware module or software module, such as module 1 762, module 2 764, and module 3 766 stored in storage device 760, configured to control the processor 720 as well as a special-purpose processor where software instructions are incorporated into the actual processor design. The processor 720 may essentially be a completely self-contained computing system, containing multiple cores or processors, a bus, memory controller, cache, etc. A multi-core processor may be symmetric or asymmetric.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices 760 such as a hard disk drive, a magnetic disk drive, an optical disk drive, tape drive or the like. The storage device 760 can include software modules 762, 764, 766 for controlling the processor 720. Other hardware or software modules are contemplated. The storage device 760 is connected to the system bus 710 by a drive interface. The drives and the associated computer-readable storage media provide nonvolatile storage of computer-readable instructions, data structures, program modules and other data for the computing device 700. In one aspect, a hardware module that performs a particular function includes the software component stored in a tangible computer-readable storage medium in connection with the necessary hardware components, such as the processor 720, bus 710, display 770, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 700 is a small, handheld computing device, a desktop computer, or a computer server.

Although the exemplary embodiment described herein employs the hard disk 760, other types of computer-readable media which can store data that are accessible by a computer, such as Solid State Drives (SSDs), magnetic cassettes, flash memory cards, digital versatile disks, cartridges, random access memories (RAMs) 750, and read-only memory (ROM) 740, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech and so forth. An output device 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic features here may easily be substituted for improved hardware or firmware arrangements as they are developed.

The embodiments illustrated and discussed in this specification are intended only to teach those skilled in the art how to make and use the invention. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:

1. A method for providing an identification mark in a structure comprising:

providing a customized programmable invisible ink onto a selected area of the structure by using an inherent porosity or intentionally added porosity to the selected area of the structure, wherein the pores are smaller than can be imaged with X-ray radiography or CT scanning;

converting the porosity of the customized programmable invisible ink to a digital data and storing the digital data in a data file;

reading using X-ray interferometry said customized programmable invisible ink.

2. The method according to claim 1, wherein providing the customized programmable invisible ink onto the selected area of the structure comprises determining a size of the porosity of the customized programmable invisible ink from a test object and a fractal of the porosity regions.

3. The method according to claim 2, further comprising testing a range of sizes of the porosity using a Cantor dust fractal.

4. The method according to claim 1, wherein providing the customized programmable invisible ink onto the selected area of the structure comprises providing the porosity such that a size of the porosity is smaller than a size of features detectable with conventional X-ray imaging.

5. The method according to claim 1, wherein providing the customized programmable invisible ink comprises printing a feature by introducing added porosity to the selected area of the structure.

6. The method according to claim 2, wherein printing the feature by introducing added porosity to the selected area of the structure comprises printing the feature using existing AM printers.

7. The methods according to claim 2, wherein printing the feature by introducing added porosity to the selected area of the structure comprises aligning pairs of hashes using an X-ray interferometry beam.

8. The method according to claim 1, further comprising forming an identification mark with the customized programmable invisible ink using manufacturing processes other than additive manufacturing.

9. The method according to claim 1, wherein the structure comprises an automotive part.

10. The method according to claim 9, wherein the automotive part comprises a sparkplug having a drawn copper rod encased in a ceramic insulator.

* * * * *